US010825121B2

(12) United States Patent
Ghannam et al.

(10) Patent No.: US 10,825,121 B2
(45) Date of Patent: Nov. 3, 2020

(54) SYSTEM AND METHOD FOR AUTHENTICATING RIDE-SHARE REQUESTS

(71) Applicant: Ford Global Technologies, LLC, Dearborn, MI (US)

(72) Inventors: Mahmoud Yousef Ghannam, Canton, MI (US); Howard E. Churchwell, II, Monroe, MI (US); Soundousse Zouani, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 16/170,087

(22) Filed: Oct. 25, 2018

(65) Prior Publication Data

US 2020/0134763 A1 Apr. 30, 2020

(51) Int. Cl.
*G06K 9/00* (2006.01)
*G06Q 50/30* (2012.01)
*G10L 17/00* (2013.01)

(52) U.S. Cl.
CPC ......... *G06Q 50/30* (2013.01); *G06K 9/00288* (2013.01); *G10L 17/00* (2013.01)

(58) Field of Classification Search
CPC .... G06Q 50/30; G06Q 10/02; G01C 21/3438; G08G 1/202; B60W 60/00253
USPC ............. 382/116; 705/5; 235/382, 380, 375, 235/487; 340/482, 425.5, 426.13, 426.16, 340/426.22
See application file for complete search history.

(56) References Cited

U.S. PATENT DOCUMENTS 10,248,913 B1 * 4/2019 Gururajan .............. G06Q 50/30

FOREIGN PATENT DOCUMENTS

CN 106533696 A 3/2017
CN 107045650 A 8/2017

OTHER PUBLICATIONS

Hasan et al., "Chained of Things: A Secure and Dependable Design of Autonomous Vehicle Services," 2018 IEEE 42nd Annual Computer Software and Applications Conference (COMPSAC), Tokyo, JP, 2018, pp. 498-503.

(Continued)

*Primary Examiner* — Charlotte M Baker
(74) *Attorney, Agent, or Firm* — Brandon Hicks; Eversheds Sutherland (US) LLP

(57) ABSTRACT

This disclosure describes a method and device for processing ride-sharing requests. The method and device process ride requests received from a first mobile device and generate a first hash corresponding to the ride request. The disclosure also describes a method and device for processing ride sharing responses. The method and device receives a ride request from a rider account, transmits a ride response to the rider account, compares a first location to a current location, determines that a difference between the first location and the current location is less than a threshold value, conducts a visual analysis of one or more persons proximate to the current location, requests that the rider audibly identify themselves, and determines, based at least in part on the audible identification and visual identification, that the rider is associated with the rider account.

16 Claims, 10 Drawing Sheets

(56) References Cited

OTHER PUBLICATIONS

Zhang et al., "Poster: Towards Fully Distributed User Authentication with Blockchain," 2017 IEEE Symposium on Privacy-Aware Computing (PAC), Washington, DC, 2017, pp. 202-203.

* cited by examiner

US 10,825,121 B2

SYSTEM AND METHOD FOR AUTHENTICATING RIDE-SHARE REQUESTS

FIELD OF THE DISCLOSURE

This disclosure generally relates to ride services, and more particularly relates to authenticating a rider requesting a ride via a ride sharing service.

BACKGROUND OF THE DISCLOSURE

Ride sharing services such as Uber™, Lyft™, and Didi™ are pervasive in many markets of the world. Oftentimes a rider, who requests a ride, will get into the incorrect car. Mistakes like this waste the rider and driver's time. For example, the driver may pick up the incorrect rider and drive the incorrect rider to the incorrect destination, resulting in the incorrect rider having to request another ride to the correct destination.

The driver may pick up the incorrect rider due to a disruption in communication between the ride sharing service's network and a device the rider uses to request a ride through the ride sharing service's network. The incorrect driver may be paired with the incorrect rider due to a disruption in communication between the ride sharing service's network and the driver's device when the ride sharing service's network forwards the request to the driver's device. Similarly, the driver may pick up the incorrect rider when the driver's device sends a response, in response to the ride request, to the ride sharing service's network, and there is a disruption in communication between the ride sharing service's network and the driver's device. The driver may also pick up the incorrect rider when the ride sharing service's network forwards the response to the rider's device, and there is a disruption in communication between the ride sharing service's network and the rider's device.

Another common scenario, is when a rider shares a device with one or more other people and the rider requests a ride through the ride sharing service using one of one or more other rider's rider accounts. The driver may send a response to a rider's request, but the driver may not recognize the rider because the rider account that the rider requested the ride from, is associated with another rider. More specifically, because the rider account may have a picture associated with the other rider's rider account, and the rider requested the ride using the other rider's rider account, when the driver arrives at the designated pickup location to pick up the rider, the driver will look for the person in the picture, not the rider. This results in the rider not being picked up, or the driver refusing to pick the rider up, because the rider is not the person in the picture. For a similar reason, when a driver shares a device with one or more other drivers, and the driver responds to the request with a response through the ride sharing service using one of one or more other driver's driver accounts the rider may not notice the driver because of a picture in the driver account of the one or more other driver accounts. As a result, the rider may refuse to get into a car with the driver, because the driver is not the person in the picture.

Because of the potential disruption in communication between the rider's device and the ride sharing service's network and the ride sharing service's network and the driver's device, a chain of transactions (e.g., a ride request and a ride response corresponding to the ride request), with errors, may result in a driver picking up the incorrect rider. One way to identify when an error has occurred is to compare information about each transaction across the rider's device, the ride share service network, and the driver's device. The comparison may be based at least in part on a consensus protocols.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF THE DISCLOSURE

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Figure 1A:
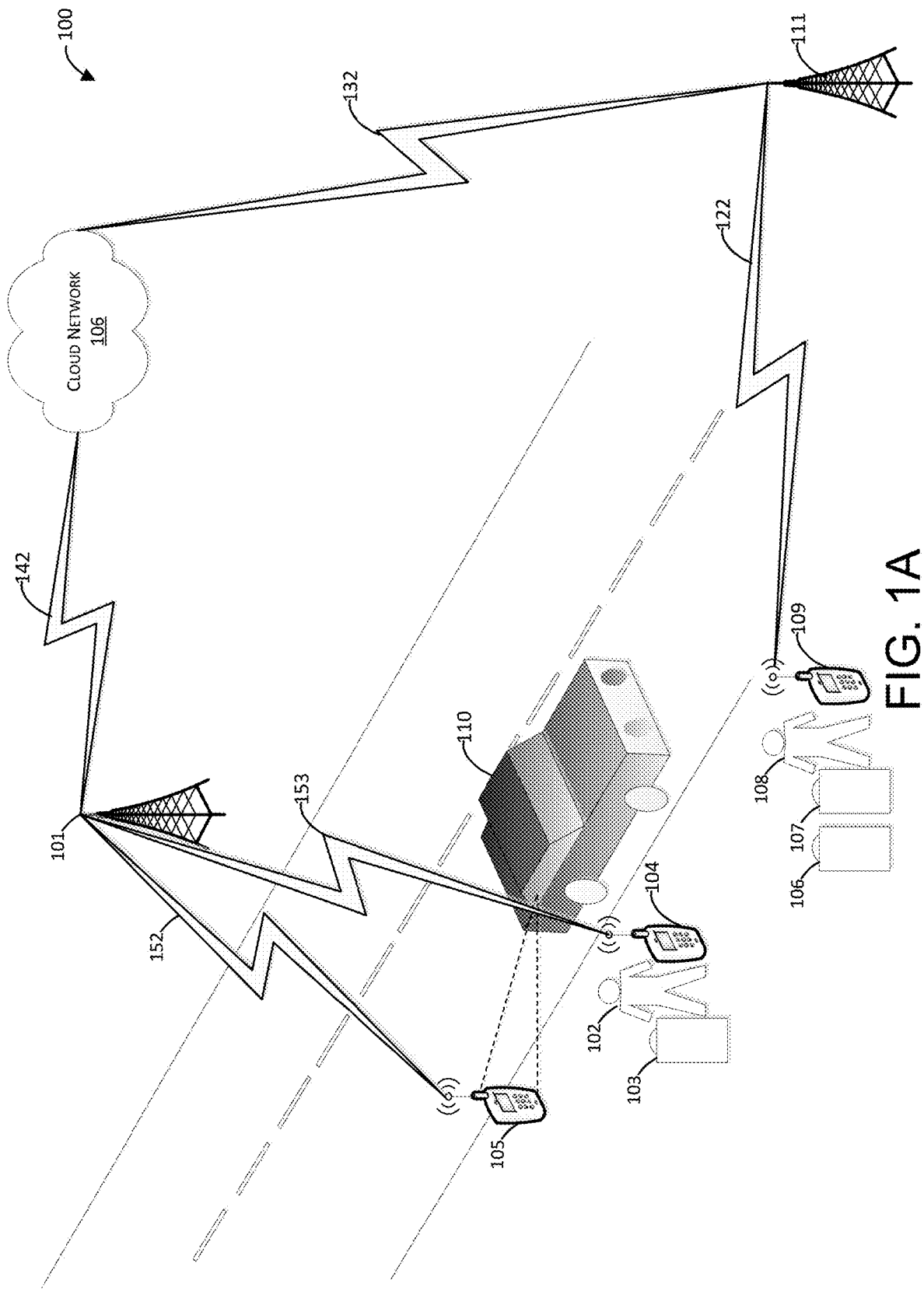
FIGS. 1A-1B depict a ride sharing service network for operating a ride sharing service, in accordance with various embodiments of the disclosure.

FIG. 1A depicts a ride sharing service network for operating a ride sharing service, in accordance with various embodiments of the disclosure. Rider sharing service network 100 may include cloud network 106, user device 105, user device 104, user device 109, cellular tower 101, and cellular tower 111. Cloud network 106 may include one or more computers and/or applications executing on the one or more computers connected via a Local Area Network, Wide Area Network, or Enterprise network managed by the ride sharing service. Cloud network 106 may host one or more services according to different models. For example, cloud network 106 may host an Infrastructure as a Service (IaaS) layer, Platform as a Service (PaaS) layer, and Software as a Service (SaaS) layer. Each of these layers offer increasing levels abstraction, in that the layers may be stacked vertically. For instance, the IaaS layer may be the bottom most layer, the PaaS layer may be on top of the IaaS layer, and the SaaS layer may be on top of the PaaS layer.

The IaaS layer may include online services that provide high-level Application Protocol Interfaces (APIs) that may be used to dereference various low-level details of underlying network infrastructure like physical computing resources, location, data partitioning, scaling, security, backup etc. A hypervisor, may run virtual machines as guests. Pools of hypervisors within cloud network 106 can support large numbers of virtual machines and the ability to scale services up and down according to ride sharing service's varying requirements. The IaaS layer may host a virtual-machine disk-image library, raw block storage, file or object storage, firewalls, load balancers, IP addresses, virtual local area networks (VLANs), and software bundles.

The PaaS layer may host a development environment for application developers. The PaaS layer may include toolkits and standards for development and channels for distribution of a rider application to end users and payment services for users to pay to download the application. The PaaS layer may include one or more computers running an operating system, programming-language execution environment, database, and/or web server. Examples of a PaaS layer may include, but are not limited to Microsoft Azure, Oracle Cloud Platform, and Google App Engine, the underlying computer and storage resources scale automatically to match application demand so that the ride sharing service does not have to allocate resources manually. The PaaS layer may include a Blockchain as a Service (BaaS), implemented in in the IBM Bluemix and/or Oracle Cloud Platform.

The SaaS layer may include application software such as software that interacts with the rider account and the rider account, and databases. The SaaS layer may be implemented on physical machines (bare metal), without using underlying PaaS or IaaS layers.

Cloud network 106 may include one or more servers that include one or more processors, one or more pools of memory, and one or more computer-readable media. The one or more computer-readable media may store a ledger that records each transaction initiated by a rider's rider account and/or each transaction initiated by a driver's driver account. The one or more computer-readable media may also store each transaction executed by the one or more processors in the one or more servers. More specifically, when the one or more processors may receive a transaction from a rider's rider account (e.g., a ride request), the one or more processors may execute instructions that cause the one or more computer-readable media to store the transaction as a hash value (ride request hash) in the ledger. The one or more processors may receive a transaction from a driver's driver account (e.g., a ride response) and execute instructions that cause the one or more computer-readable media to store the transaction as a hash value (ride response hash) in the ledger.

When the one or more processors receive the ride request, the one or more processors may execute instructions that cause the one or more processors to validate the ride request, and the one or more processors may transmit the ride request to the driver's driver account. The transmission of the ride request to the driver's driver account may be hashed by the one or more processors, and stored in the ledger. When the one or more processors receive the ride response, the one or more processors may execute instructions that cause the one or more processors to validate the ride response, and the one or more processors may transmit the ride response to the rider's rider account. The transmission of the ride response to the rider's rider account may be hashed by the one or more processors, and stored in the ledger. An example embodiment of the hashing process is included below in FIG. 4 and FIG. 5.

Cellular towers 101 and 111 are only representative of two cellular towers, possibly owned by the same cellular service provider, or possibly owned by different cellular service providers. Cellular towers 101 and 111 may include one or more electronics implementing a global system for mobile communications (GSM) cellular protocol, a code division multiple access (CDMA) protocol, or a long term evolution (LTE) protocol. Cellular towers 101 and 111 may be connected to cloud network 106 via an enterprise network or leased lines of the cellular service provider.

Mobile devices 105, 104, and 109 may send and receive data to cloud network 106 via cellular towers 101 and 111. For example, mobile device 105 may connect to cloud network 106 via cellular tower 101 and connections 152 and 142. Mobile device 109 may connect to cloud network 109 via cellular tower 111 and connections 122 and 132. Mobile device 104 may connect to cloud network 109 via cellular tower 101 and connections 153 and 142. Mobile device 105 may execute one or more computer-executable instructions, associated with a driver account, on one or more processors, in mobile device 105, that enable mobile device 105 to transmit a driver response to a ride request transmitted by mobile device 104 or mobile device 109. Mobile device 104 may execute one or more computer-executable instructions, associated with a rider account, on one or more processors, in mobile device 104, that enable mobile device 104 to transmit a ride request to mobile device 105 via cloud network 106. Mobile device 109 may execute one or more computer-executable instructions, associated with a rider account, on one or more processors, in mobile device 109, that enable mobile device 109 to transmit a ride request to mobile device 105 via cloud network 106.

Automobile 110 may be driven by a driver (not shown in FIG. 1A), or automobile 110 may be an autonomous vehicle. Automobile 110 may include one or more hardware components of a mobile device such as, mobile device 105, that may be embedded in the hardware of automobile 110. The one or more components may include, one or more processors, one or more transceivers, one or more antennas, one or more microphones, one or more speakers, one or more displays, and/or one or more radios that may be included in a dashboard of automobile 110, or throughout automobile 110. The placement of the hardware components in automobile 110 may be optimally placed to authenticate a rider who has requested a ride. Automobile 110 may be traveling down a road and may stop within a general vicinity of a location that a rider is anticipated to be at.

Rider 102 may be a first person holding mobile device 104, and may be the first person associated with a first rider account requesting a ride. Rider 102 may have a piece of luggage (e.g., luggage 103). Rider 108 may be a second person holding mobile device 109, and may be the second person associated with a second rider account requesting a ride. Rider 108 may have two pieces of luggage (e.g., luggage 106 and luggage 107). As automobile 110 drives down the road, either the driver of automobile 110 may look for the rider corresponding to a picture associated with the rider's rider account, or a camera on automobile 110 may take a picture within an area of the rider location recorded in the driver's account The camera may send the picture to one or more processors in automobile 110 or one or more servers in cloud network 106 to perform facial recognition to determine that there is a) a rider in the area; and b) the rider is the rider associated with the rider's account that requested a ride. The one or more processors in automobile 110 or the one or more servers in cloud network 106 may compare the picture taken to the picture associated with the rider's rider account, and determine that the rider in the area is the rider to be picked up (rider who requested the ride).

In some embodiments, the driver's driver account may include computer-executable instructions that may cause a processor in mobile device 105 to execute instructions that cause a camera in mobile device 105 to prompt the driver to start recording the area of the location that the rider is anticipated to be at. The driver may respond to the prompt and press a button on a display of mobile device 105 that may cause mobile device 105 to start recording video footage, or take a series of photographs, in the area as the driver pans the area looking for the rider. The camera may send a picture of the video footage, or the series of photographs, to the to one or more processors in mobile device 105 or one or more servers in cloud network 106 to perform facial recognition to determine that there is a) a rider in the area; and b) the rider is the rider associated with the rider's account that requested a ride. The one or more processors in mobile device 105 or the one or more servers in cloud network 106 may compare the picture taken to the picture associated with the rider's rider account, and determine that the rider in the area is the rider to be picked up (rider who requested the ride). This is one example of the way in which a rider may be authenticated.

In some embodiments, mobile device 105 may collect audio sounds from the rider to determine that the rider who requested the ride is the rider the driver should pick up. In other embodiments, automobile 110 may include one or more microphones that may collect audio sounds from the rider to determine that the rider who provided the audio data is the rider who requested the ride and is the rider the driver should pick up. For example, if there are two riders side by side, the driver may place mobile device 105 outside automobile 110 and ask the two riders whether they requested a ride. The driver's driver account may include one or more computer-executable instructions that may cause the one or more processors in mobile device 105 to cause a microphone to start recording audio signals generated by the two riders when they speak to the driver to acknowledge that they requested a ride. For instance, when the driver asks for the name of the riders, the microphone in mobile device 105 may collect an audio signal corresponding to an audible sound generated by the riders, in response to the driver's question. The one or more processors may perform a speech processing analysis of the audible sound to determine who the correct rider is. This is another example of a way to authenticate the correct rider. For example, a first rider may request a ride using a second rider's rider account and the first rider may attempt to get into automobile 110, however the driver of automobile 110 may confirm that the rider who requested the ride is the second rider, by asking the first rider whether they are the second rider. If the first rider says that they are the second rider, mobile device 105 may record an audible sound associated with the first rider's response to the driver's question and the one or more processors of mobile device 105 may determine, as a result of performing the speech processing analysis, that the first rider is not the second rider. The one or more processors in mobile device 105 may accomplish this by executing computer-executable instructions that cause the one or more processors to compare a pre-recorded audible sound generated by the second rider to the audible sound generated by the first rider. In some embodiments, one or more servers in cloud network 112 may perform the speech processing analysis, and authenticate the first rider. The one or more servers may be edge servers that may be located at or near cellular towers 111 or 101. In the embodiments in which automobile 110 is an autonomous vehicle, one or more processors in automobile 110 may perform the speech processing analysis or transmit a signal that includes an audio signal corresponding to the audible sound to the one or more servers, and the one or more servers may authenticate the first rider.

A driver of automobile 110 may drive past other riders based on the clothing that they are wearing the number of pieces of luggage they are carrying, or other personal items they may be carrying with them. Because automobile 110 may comprise one or more cameras, the one or more cameras may record footage of an area within vicinity of the location where the rider is anticipated to be at and may identify the clothing that a rider is wearing, number of pieces of luggage they are carrying, or other personal items that they are carrying. The one or more processors in automobile 110 may determine, based on the footage, the clothing of a person on a sidewalk, and may perform an image processing analysis to determine whether the clothing of the person on the sidewalk corresponds to clothing that the rider said that they were wearing when the rider transmitted a request for a ride. This is another example of a way the one or more processors may be able to authenticate the rider.

Figure 1B:
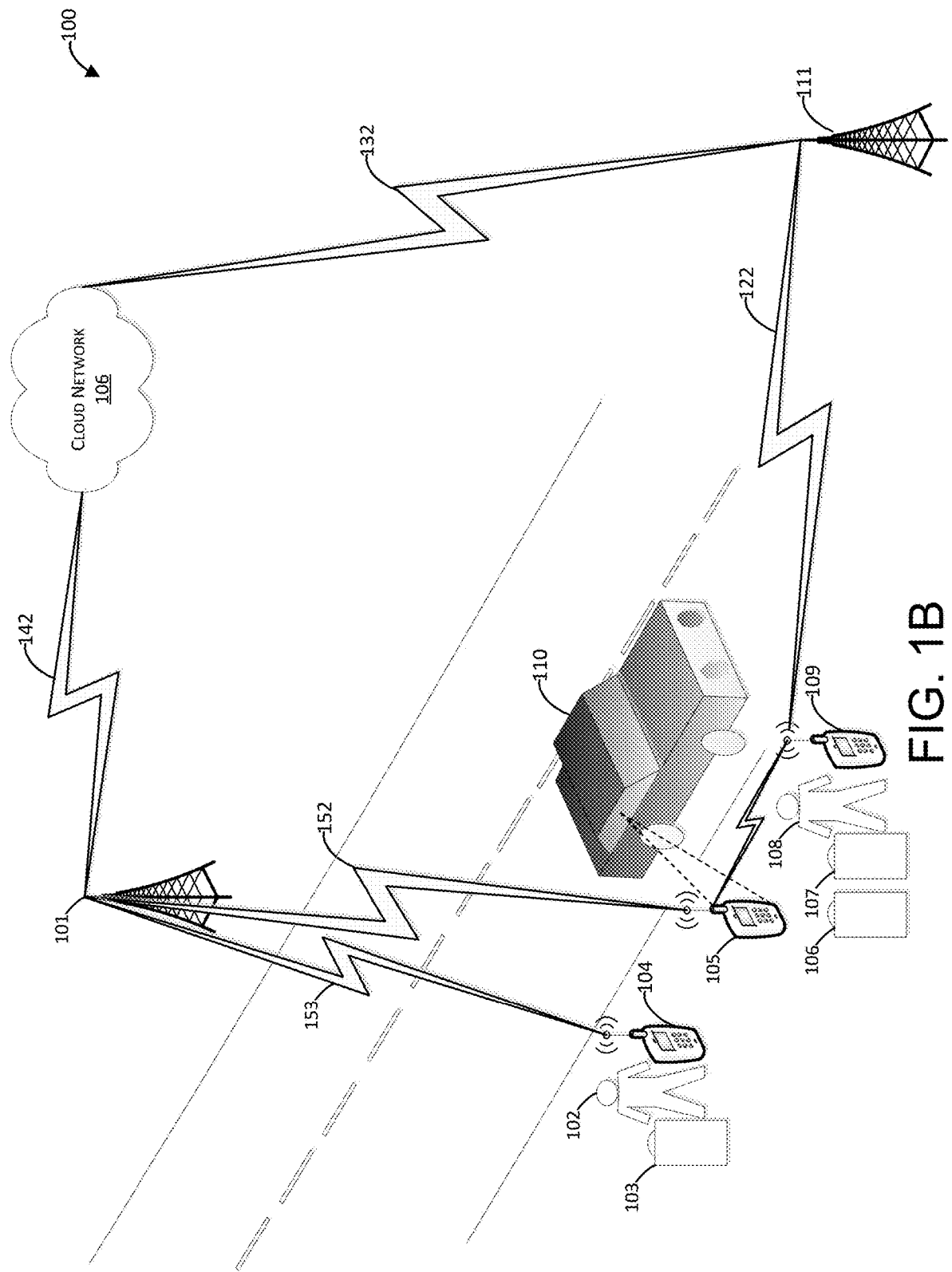

The one or more processors may determine, based on the footage, the number of pieces of luggage next to a person on a sidewalk and may perform an image processing analysis to determine whether the number of pieces of luggage next to the person on the sidewalk corresponds to the number of pieces of luggage that the rider said they had when the rider transmitted a request for a ride. The one or more processors may even compare an image of the luggage captured in the footage to an image of the luggage that a rider may have taken in a photo. The one or more processors may perform an image processing analysis to determine whether the luggage, captured in the footage, is the same as the luggage in the photo. The rider may then be authenticated based on the one or more processors determining that the luggage is the same. The one or more processors in mobile device 105 may also authenticate a rider in a way similar to that, as automobile 110 may authenticate the rider based on the number of pieces of the clothing they are wearing, the number of pieces of luggage the rider is carrying, and/or the physical aspects of the luggage itself. For example, in FIG. 1B, automobile 110 may pass by rider 102 because mobile device 105 may determine that rider 102 has one piece of luggage (e.g., luggage 103), whereas rider 108 has two pieces of luggage (e.g., luggage 106 and luggage 107), and the driver of automobile 110 is scheduled to pick up a rider with two pieces of luggage. The driver will stop next to rider 108 because mobile device 105 determines that rider 108 is the correct rider to pick up. It should be noted that the driver can also determine where to stop based on visually determining the number of pieces of luggage a rider is carrying.

Figure 2:
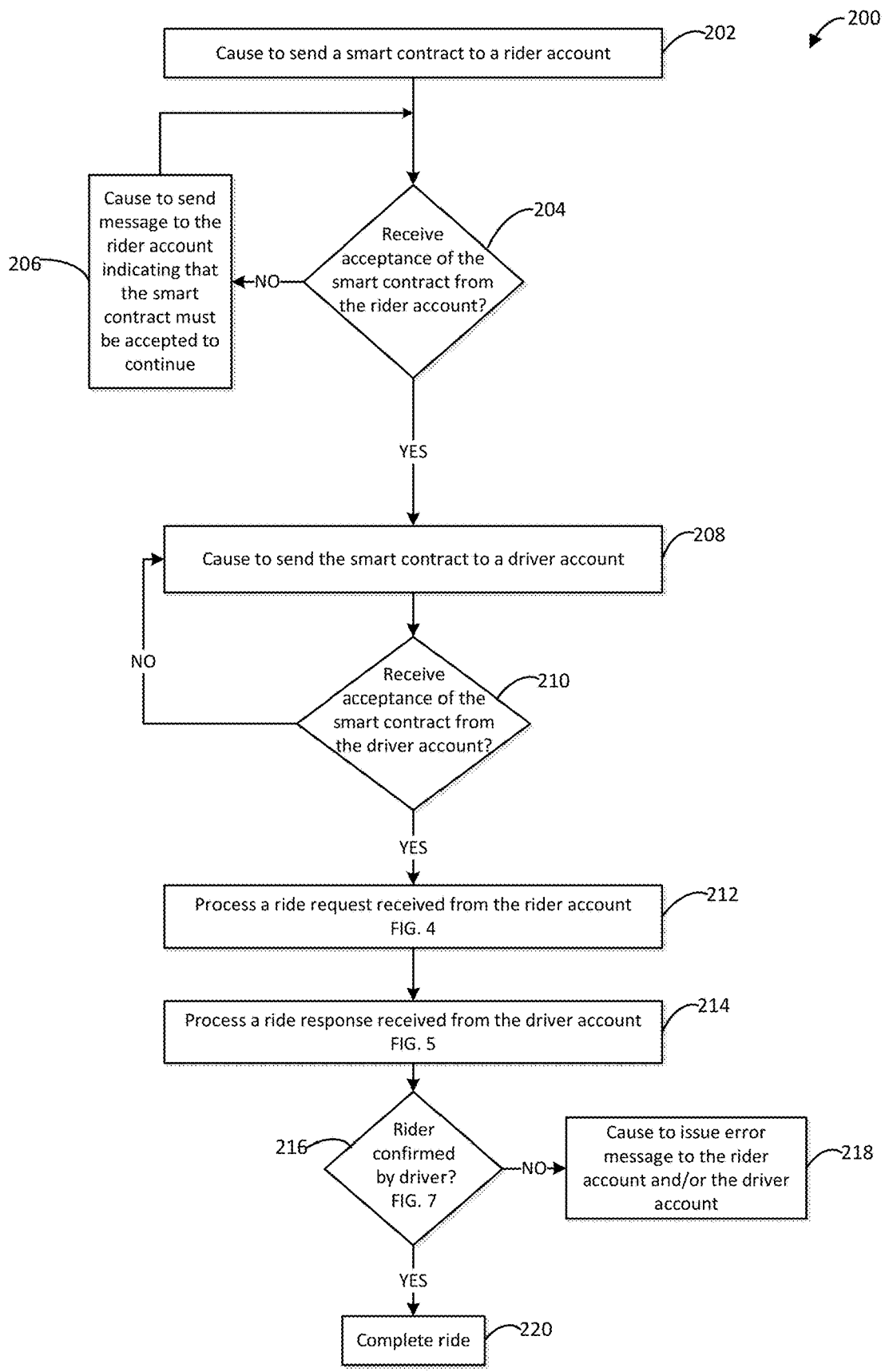
FIG. 2 depicts an illustrative flowchart of a ride sharing service network cloud connecting a rider's rider account, requesting a ride, to a driver's driver account, issuing a response to the request, in accordance with various embodiments of the disclosure.

FIG. 2 depicts an illustrative flowchart of a ride sharing service network cloud connecting a rider's rider account, requesting a ride, to a driver's driver account, issuing a response to the request, in accordance with various embodiments of the disclosure. It will be readily appreciated that the illustrated procedure can be altered to delete steps or further include additional steps. While the following description is directed to a method (i.e., method 200) being performed by the one or more servers in cloud network 106, it is appreciated that the method can be performed in whole or in part by a device other than the one or more servers (e.g., an edge server located at or near cellular towers 101 and/or 111).

After an initial start step, the cloud network 106 may cause to send a smart contract to a rider account at step 202. The smart contract may include one or more terms that must be met, or accepted by a rider before the rider is able to request a ride. The one or more requisites may include age, drinking terms, and/or agreement not to impersonate another rider. For example, the one or more severs in cloud network 106 may transmit the smart contract to mobile device 109 via cellular tower 111. More specifically the one or more processors, in the one or more servers, may transmit the smart contract to a processor on mobile device 109 that is executing instructions corresponding to the rider account on mobile device 109.

The method may progress to step 204, and determine whether the cloud network 106 receives acceptance of the smart contract from the rider via the rider account. If the cloud network 106 does not receive acceptance of the smart contract, the method may progress to step 206 where the cloud network 106 may cause to send a message to the rider account indicating that the smart contract must be accepted in order to continue. That is, the cloud network 106 must receive a message from the rider account indicating that the rider has accepted the terms of the smart contract in order for the method to progress to step 208. For example, the one or more processors in cloud network 106 may transmit the message to the processor on mobile device 109.

In some embodiments, if the cloud network 106 does not receive an acceptance from the rider's account, the cloud network 106 may resend the smart contract to the rider account. That is, the method may return to step 202. If after a certain number of times, the cloud network 106 does not receive an acceptance from the rider's account, the cloud network 106 may stop resending the smart contract to the rider account. If the cloud network 106 does receive an acceptance of the smart contract, from the rider account, the method may progress to step 208. For example, the one or more processors in cloud network 106 may retransmit the smart contract to the processor in mobile device 109 until it receives an acceptance of the smart contract from the rider. The one or more processors however may stop retransmitting the smart contract to the processor in mobile device 109 after a finite number of times and may sever the connection to mobile device 109.

At step 208, the cloud network 106 may cause to send the smart contract to a driver account. For example, the one or more processors in the one or more servers in cloud network 106, may transmit the smart contract to a processor in mobile device 105. More specifically the one or more processors, in the one or more servers, may transmit the smart contract to a processor on mobile device 105 that is executing instructions corresponding to the driver account on mobile device 105.

The driver account may be an account associated with a driver who may be paired with a rider associated with the rider account. That is the driver may be paired with a rider who the driver may pickup after the smart contract is accepted by the driver. A rider may be paired with a driver after both the rider and the driver have accepted the smart contract. The process of pairing the rider with the driver is detailed below in steps 212-214.

The method may progress to step 210, where the cloud network 106 may determine whether it receives acceptance of the smart contract from the driver account. If the cloud network 106 does not receive acceptance of the smart contract, the method may return to step 208 where the cloud network 106 may cause to send the smart contract to the driver account indicating that the smart contract must be accepted in order to continue. For example, the one or more processors in cloud network 106 may transmit the message to the processor on mobile device 105. If after a certain number of times, the cloud network 106 does not receive an acceptance from the driver's account, the cloud network 106 may stop resending the smart contract to the rider account. If the cloud network 106 does receive an acceptance of the smart contract, from the driver account, the method may progress to step 212. For example, the one or more processors in cloud network 106 may retransmit the smart contract to the processor in mobile device 105 until it receives an acceptance of smart contract from the driver. The one or more processors however may stop retransmitting the smart contract to the processor in mobile device 105 after a finite number of times and may sever the connection to mobile device 105.

After the smart contract is accepted by the rider account and the driver account, the method may progress to step 212, and the cloud network 106 may process a ride request received from the rider account. For example, the one or more servers in cloud network 106 may receive a ride request from mobile device 109. The cloud network 106 may process the ride request in accordance with the steps in method 400, and store the ride request as a hash value. After the cloud network 106 processes the ride request, the cloud network 106 may process a ride response received from the driver account. The cloud network 106 may process the ride request in accordance with the steps in method 500, and store the ride response as a hash value. For example, the one or more servers in cloud network 106 may receive a ride response from mobile device 105. The ride response may be received and processed by the one or more servers in response to the ride request.

After the ride request and ride response are processed, the cloud network 106 may determine whether the driver account was able to confirm the rider account at step 216. In some embodiments, the driver may confirm the rider visually based what they look like, what they are wearing, and possibly the luggage that the rider is carrying or otherwise has with them. If the rider is confirmed, the ride may be completed in step 220. If the rider account/rider is not confirmed by the driver account/driver, the cloud network 106 may issue an error message to the rider account and/or the driver account at step 218. For example, the one or more servers in cloud network 106 may issue the error message to the rider account and the driver account.

Figure 3:
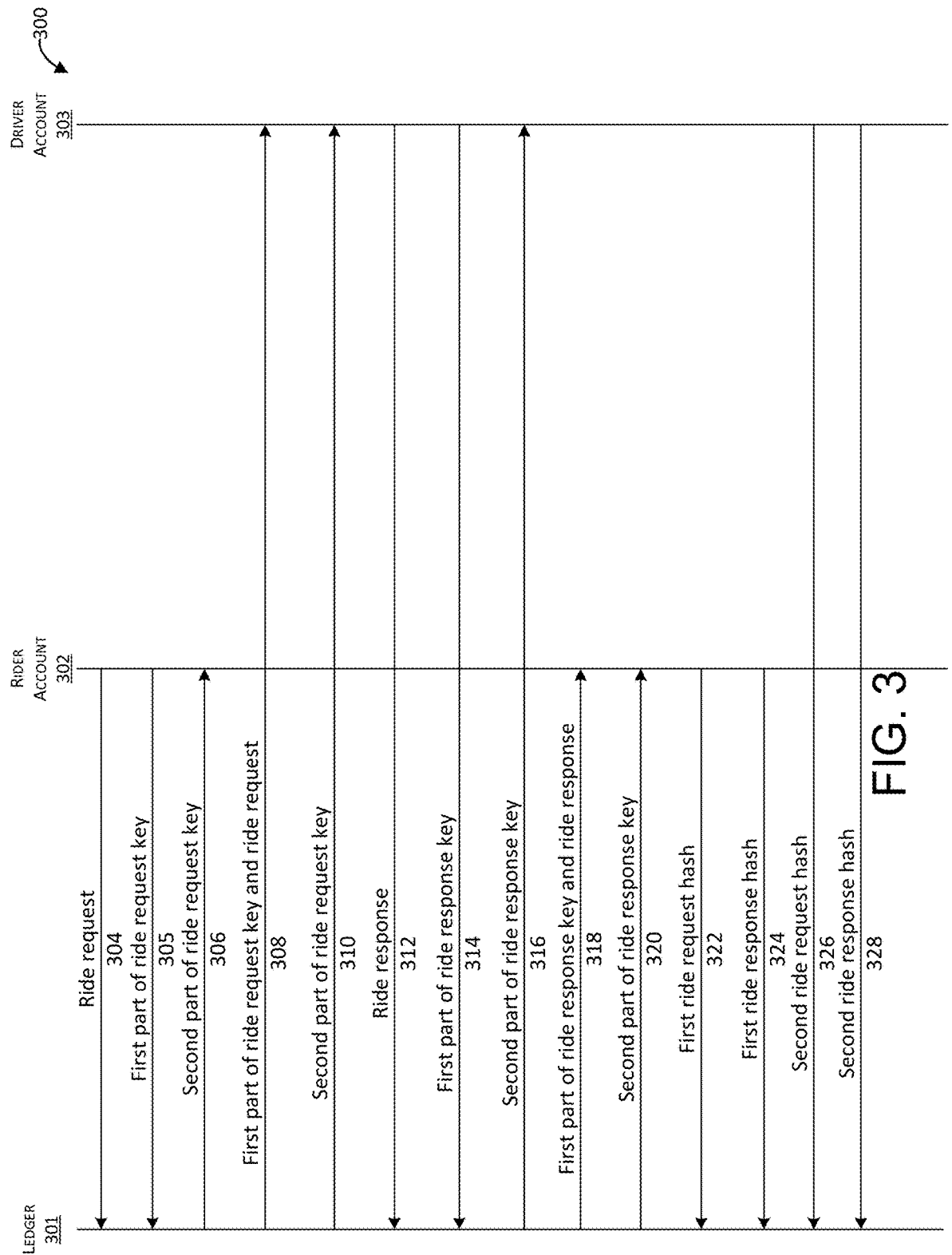
FIG. 3 depicts an illustrative timing diagram of a ride sharing service network cloud connecting a rider's rider account, requesting a ride, to a driver's driver account, issuing a response to the request, in accordance with various embodiments of the disclosure.

FIG. 3 depicts an illustrative timing diagram of a ride sharing service network cloud connecting a rider's rider account, requesting a ride, to a driver's driver account, issuing a response to the request, in accordance with various embodiments of the disclosure.

Ledger 301 may be stored in the one or more servers in a cloud network similar to cloud network 106. Rider account 302 may be a rider account executing on a rider's mobile device (e.g., mobile device 104 and/or mobile device 109). Driver account 303 may be a driver account executing on a driver's mobile device (e.g., mobile device 105). The transactions (304-328) in timing diagram 300 may occur after rider account 302 and driver account 303 have accepted a smart contract as described above in FIG. 2. Ledger 301 may receive a ride request (e.g., ride request 304) from rider account 302. For example, rider account 302 may be executing on mobile device 109, and rider account 302 may transmit ride request 304 to ledger 301, responsive to rider 108 selecting a button, displayed on mobile device 109, corresponding to a ride request.

After ledger 301 receives ride request 304, ledger 301 may receive a first part of ride request key 305. The first part of ride request key 305 may be a first portion of a ride request key. The ride request key may include the first part of the ride request key and a second part of the ride request key 306. The first part of the ride request key 305 may be stored in rider account 302, and the second part of the ride request key 306 may be stored in ledger 301. Ledger 301 and rider account 302 may validate the ride request key by hashing a combination of the first part 305 and the second part 306 of the ride request key. For example, when ledger 301 receives the first part of ride request key 305, the one or more processors in the one or more servers of cloud network 106 may store the first part of ride request key 305 in ledger 301. Ledger 301 may also store the second part of ride request key 306, and the one or more processors may apply a ride request hashing function to the first part of ride request key 305 and the second part of the ride request key 306 to validate the ride request key. Because ledger 301 stores the second part of the ride request key (the second part of ride request key 306) ledger 301 will transmit the second part of ride request key 306 to rider account 302. Because rider account 302 stores the first part of ride request key 305, the processor in mobile device 109 may apply the ride request hashing function to the first part of ride request key 305 and the second part of ride request key 306 to validate the ride request key. The resulting hash value may be a first ride request hash.

Ledger 301 may transmit the first part of the ride request key 305 and the ride request 308 to driver account 303. Ledger 301 may transmit the second part of ride request key 310 to driver account 303. The key in second part of ride request key 310 is the same as the key in second part of ride request key 306. Ledger 301 may transmit the first part of ride request key 305 and ride request 308, and the second part of ride request key 310 to driver account 303 so that driver account 303 may validate the ride request key. The key in second part of ride request key 310 is the same as the key in second part of ride request key 306. Because driver account 303 receives and stores the first part of ride request key 305 and ride request 308, and the second part of ride request key 310, the processor in mobile device 105 may apply the ride request hashing function to the first part of the ride request key, received in first part of ride request key and ride request 308. The processor in mobile device 105 may also receive the second part of ride request key 310 to validate the ride request key. The resulting hash value may be a second ride request hash.

Ledger 301 may receive ride response 312, from driver account 303, in response to sending the second part of ride request key 310 to driver account 303. Ledger 301 may also receive the first part of ride response key 314, and ledger 301 may transmit the second part of the ride response key 316 to driver account 303. Because ledger 301 stores the second part of ride response key, the one or more processors may apply a ride response hashing function to the second part of ride response key 316 and the first part of the ride response key 314 to validate the ride response key. Because driver account 303 stores the first part of ride response key 314, the processor in mobile device 105 may apply the ride response hashing function to the first part of ride response key 314 and the second part of ride response key 316 to validate the ride response key. The resulting hash value may be a second ride response hash.

Ledger 301 may transmit the first part of ride response key and ride response 318 to rider account 302. Ledger 301 may also transmit the second part of ride response key 320 to rider account 302. Rider account 302 may apply the ride response hashing function to the first part of ride response key and the second part of ride response key 320 to validate the ride response key. The resulting hash value may be a first ride response hash.

Ledger 301 may receive a first ride request hash 322 from rider account 302 and a first ride response hash 324, from rider account 302. Ledger 301 may then receive a second ride request hash 326 and a second ride response hash 328, from driver account 303. Ledger 301 may store the first ride request hash 320, the first ride request hash 322, the second ride request hash 326, and the second ride response hash 328. The one or more processors, in the one or more servers of cloud network 106, may compare the first ride request hash 322 to a ride request hash generated by the one or more processors to validate a ride request key. That is, the ride request hash, generated by the one or more processors to validate the ride request key, may be compared to the first ride request hash 324 and may also be compared to the second ride request hash 326. The one or more processors may compare the ride request hash, generated by the one or more processors, to the first ride request hash 324 and may also compare it to the second ride request hash 326, to determine a location of mobile device 109. Similarly, the one or more processors may compare the ride response hash, generated by the one or more processors, to the first ride response hash 325 and may also compare it to the second ride response hash 328, to determine a location of mobile device 105. The details of the process of determining a location of a rider account executing on a mobile device and a mobile device executing a driver account are explained more fully below in FIGS. 4-5.

Figure 4:
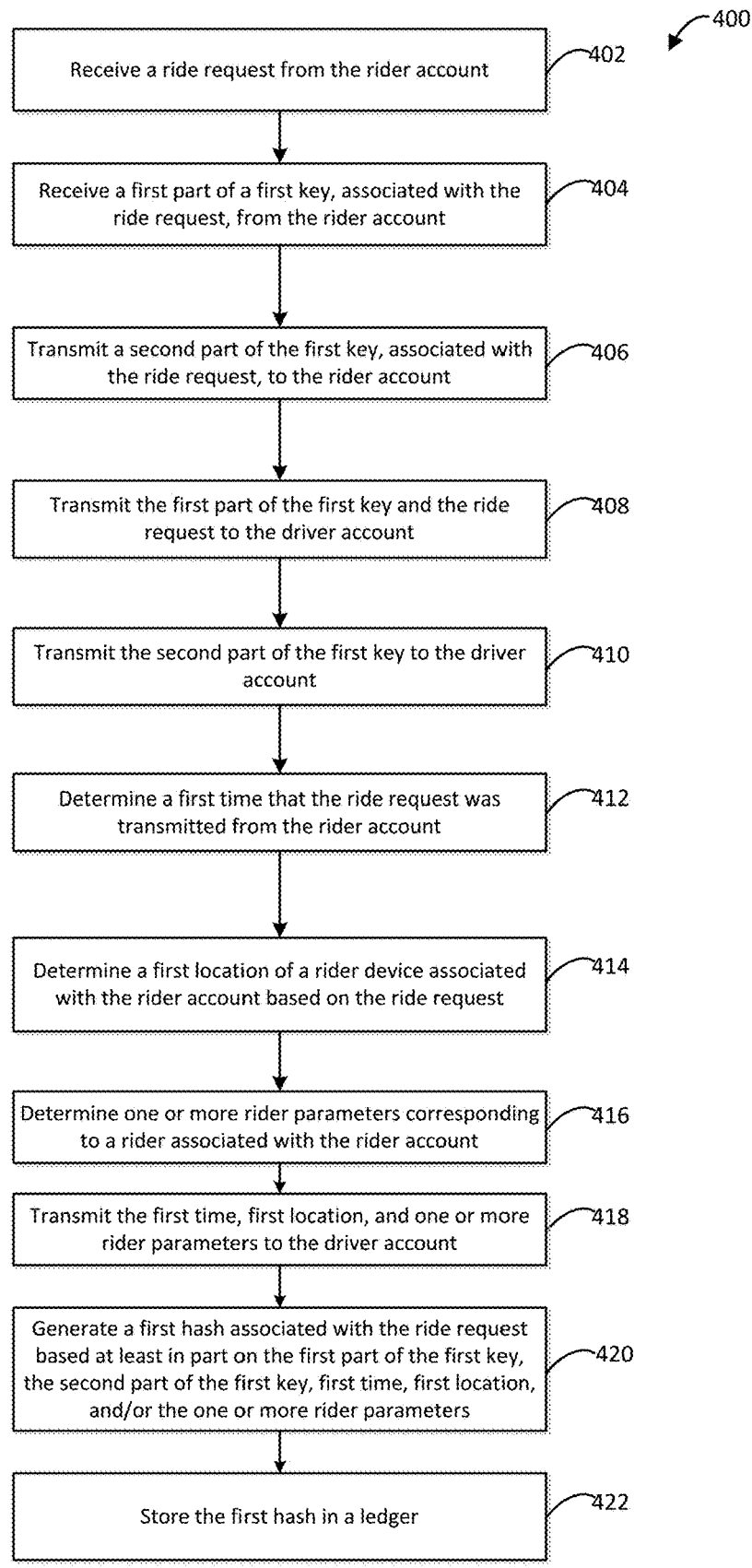
FIG. 4 depicts an illustrative flowchart of the ride sharing service network cloud processing a ride request received from a rider account, in accordance with various embodiments of the disclosure.

FIG. 4 depicts an illustrative flowchart of the ride sharing service network cloud processing a ride request, received from a rider account, in accordance with various embodiments of the disclosure. It will be readily appreciated that the illustrated procedure can be altered to delete steps or further include additional steps. While the following description is directed to a method (i.e., method 400) being performed by the one or more servers in cloud network 106, it is appreciated that the method can be performed in whole or in part by a device other than the one or more servers (e.g., an edge server located at or near cellular towers 101 and/or 111).

At step 402, the cloud network 106 may receive a ride request from the rider account. As explained above, the ride request is a transaction and will be stored in a ledger (e.g., ledger 301 as implemented by ledger 931). The ride request is stored in the ledger as a hashed value. The cloud network 106 may then receive a first part of a first key, associated with the ride request, from the rider account. For example, ledger 301 may receive the first part of a first key from rider account 302. The method may then progress to step 406, where the cloud network 106 transmits a second part of the first key, associated with the ride request, to the rider account. For example, the ledger 301 may transmit the second part of the first key to rider account 302. The method may then progress to step 408, where the cloud network 106 transmits the first part of the first key and the ride request to the driver account. For example, ledger 301 may transmit the first part of the first key and the ride request to driver account 303. The method may then progress to step 410, where the cloud network 106 transmits the second part of the first key to the driver account. For example, ledger 301 may transmit the second part of the first key to driver account 303.

The method may then progress to step 412, where the cloud network 106 may determine a first time that the ride request was transmitted from the rider account. For example, ledger 301 may determine a time at which the ride request was transmitted by rider account 302. More specifically, the one or more processors in the one or more servers of cloud network 106 may identify a timestamp in the ride request and determine the time at which the rider account transmitted the ride request. Because ledger 301 stores the ride request as a hashed value, ledger 301 also stores, along with the ride request, the time at which the rider account transmitted the ride request. Ledger 301 also stores the location of the rider device that the rider account is installed on. It should be noted that even though the time at which the ride request was transmitted is a unique value, the hashed value of the ride request, as calculated by the processor in the rider device, may be slightly different than the hash value calculated by the one or more processors in the one or more servers. The reason why the hash value calculated by the processor may be different than the hash value calculated by the one or more processors is because the location determined by the processor in the rider device may be different than the location determined by the one or more processors in the one or more servers of the cloud network 106.

The method may then progress to step 414, where the cloud network 106 may determine a first location of a rider device associated with the rider account (e.g., rider account 302) based on the ride request. For example, ledger 301 may determine a location of a mobile device (e.g., mobile device 104 and/or mobile device 109) at which the mobile device transmitted the ride request. The rider account may be associated with the mobile device. More specifically, the one or more processors in the one or more servers of cloud network 106 may identify a location at which the ride request was transmitted by the rider device, based on location coordinates (e.g., Global Positioning System (GPS) coordinates) in the ride request. The one or more processors may determine the location of the rider device when the rider account, executing on a processor of the rider device, transmitted the ride request. Because ledger 301 stores the ride request as a hashed value, ledger 301 also stores along with the ride request, the location at which the rider device transmitted the ride request. Because the location of the rider device, at which the ride request was transmitted, as determined by the one or more processors, may be different than the location of the rider device, as determined by the processor in the rider device, the hashed value stored in ledger 301 of the ride request, the time, and the location at which the ride request was transmitted may be different than the hashed value determined by the processor in the rider device.

The reason why the location as determined by the processor in the rider device may be different from the location as determined by the one or more processors may be due to a GPS receiver in the rider device incorrectly calculating the GPS coordinates. For example, the GPS receiver may calculate GPS coordinates for the rider device that do not coincide with a location where a rider would be picked up. For instance, the GPS receiver may calculate the GPS coordinates of an abandoned building, and the processor may determine that the GPS coordinates coincide with the actual location of the rider device. Because the hashed value is based on the location of the rider device, which coincides with the GPS coordinates, the hashed value will be based on the coordinates of the abandoned building. The one or more servers however may have access to additional map data that the one or more processors can use to determine that the rider device is not in the abandoned building, but rather on a sidewalk, for example, next to the abandoned building. Accordingly, the one or more processors may determine that the GPS coordinates of the rider device are different from the GPS coordinates calculated by the GPS receiver. As a result, the location stored in ledger 301, for the rider device, is different from the location stored in rider account 302. Driver account 303 may also receive and store the location of the rider device from ledger 301, and the processor in the driver device may determine that the location of the rider device is different from the location stored in rider account 302. The location of the rider device, determined by the processor in the driver device, may be different from the location stored in ledger 301.

After determining the time and location at which the rider device transmitted the ride request the method may progress to step 416. At step 416, the cloud network 106 may determine one or more rider parameters corresponding to a rider associated with the rider account. For example, rider 108 may take a picture that is recorded in her rider account (e.g., rider account 302). The one or more rider parameters associated with the rider may be hair color, eye color, any number of facial parameters (e.g., shape of lips, eyes, nose, eyebrows, ears, etc.) that may be recognizable by a human or facial recognition software. The one or more rider parameters could also be personally identifiable marks such as scars and/or tattoos. Additionally, the one or more rider parameters may include clothing that the rider is wearing at the time the rider transmitted the ride request. At least a portion of these one more rider parameters may have been input by the rider via a description field of the rider account, or by way of a picture taken by the rider around the time the rider account transmitted the ride request. Because ledger 301 stores the ride request as a hashed value, ledger 301 also stores along with the ride request, the one or more rider parameters corresponding to the rider. Because the one or more rider parameters of each rider is unique (barring identical twins), the hashed value of the ride request may have a further degree of uniqueness based on the one or more rider parameters corresponding to the rider. After step 416, the method may progress to step 418, where the cloud network 106 can transmit the first time, first location, and one or more rider parameters to the driver account. For example, ledger 301 may transmit the first time that the ride request was transmitted, the first location of the rider device when the ride request was transmitted, and the one or more rider parameters to driver account 303.

At step 420, the cloud network 106 may generate a first hash associated with the ride request based at least in part on the first part of the first key, the second part of the first key, first time, first location, and the one or more rider parameters. More specifically the one or more processors in the one or more servers in cloud network 106 may generate the first hash, and then may store the first hash in the ledger (e.g., ledger 301) at step 422. After the cloud network 106 stores the first hash in the ledger, the method may return to method 200.

Figure 5:
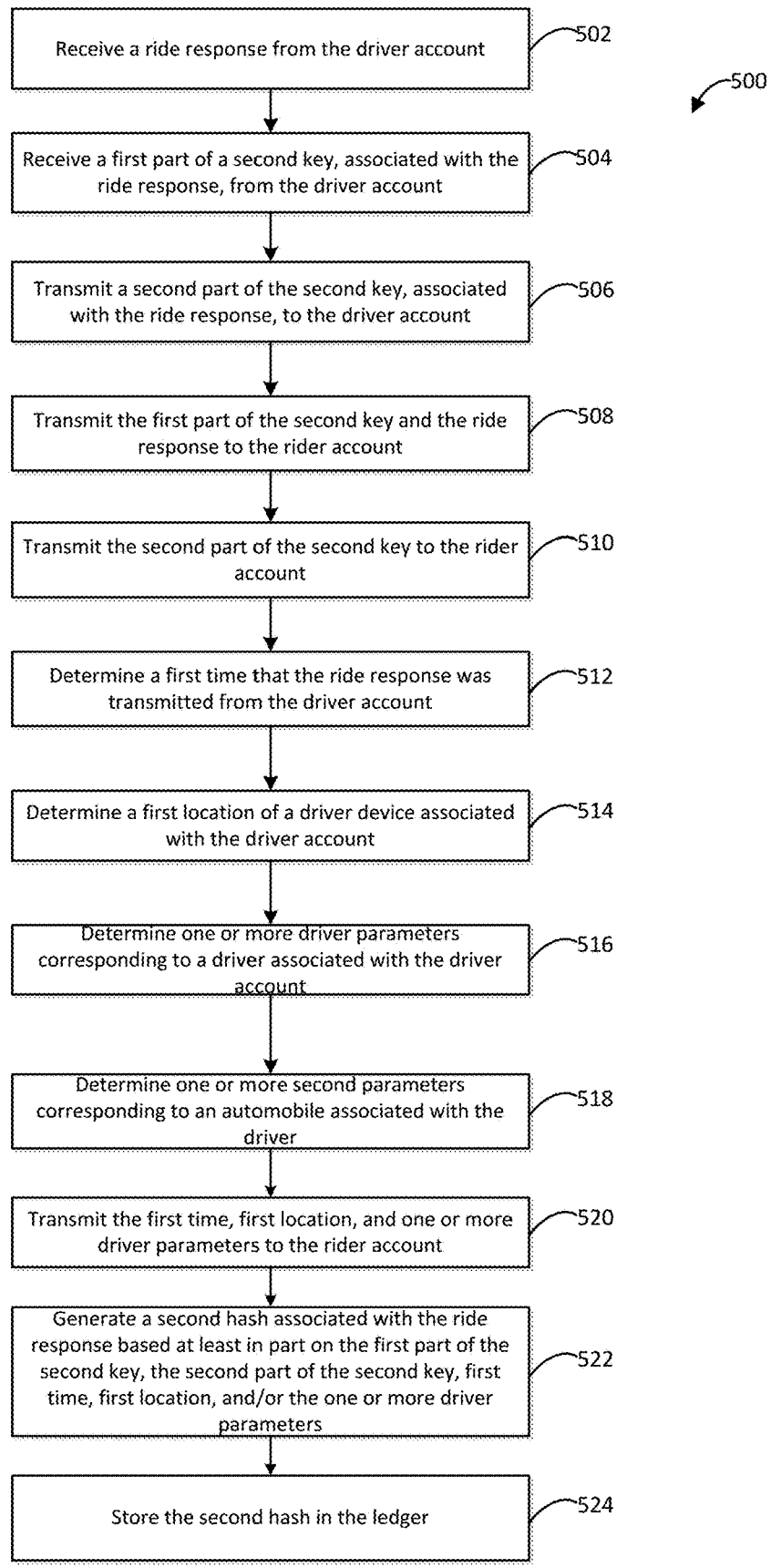
FIG. 5 depicts an illustrative flowchart of the ride sharing service network processing a ride response received from a driver account, in accordance with various embodiments of the disclosure.

FIG. 5 depicts an illustrative flowchart of the ride sharing service network processing a ride response, received from a driver account, in accordance with various embodiments of the disclosure. It will be readily appreciated that the illustrated procedure can be altered to delete steps or further include additional steps. While the following description is directed to a method (i.e., method 500) being performed by the one or more servers in cloud network 106, it is appreciated that the method can be performed in whole or in part by a device other than the one or more servers (e.g., an edge server located at or near cellular towers 101 and/or 111).

At step 502, the cloud network 106 may receive a ride response from the driver account. As explained above, the ride response is a transaction and will be stored in a ledger (e.g., ledger 301 as implemented by ledger 931). The ride response is stored in the ledger as a hashed value. The cloud network 106 may then receive a first part of a second key associated with the ride response from the driver account. For example, ledger 301 may receive the first part of a second key from driver account 303. The method may then progress to step 506, where the cloud network 106 transmits a second part of the second key associated with the ride response to the driver account. For example, the ledger 301 may transmit the second part of the second key to driver account 303. The method may then progress to step 508, where the cloud network 106 may transmit the first part of the second key and the ride response to the rider account. For example, ledger 301 may transmit the first part of the second key and the ride response to rider account 302. The method may then progress to step 510, where the cloud network 106 may transmit the second part of the second key to the rider account. For example, ledger 301 may transmit the second part of the second key to rider account 302.

The method may then progress to step 512, where the cloud network 106 may determine a first time that the ride response was transmitted from the driver account. For example, ledger 301 may determine a time at which the ride response was transmitted by driver account 303. More specifically, the one or more processors in the one or more servers of cloud network 106 may identify a timestamp in the ride response and determine the time at which the driver account transmitted the ride response. Because ledger 301 stores the ride response as a hashed value, ledger 301 also stores, along with the ride response, the time at which the driver account transmitted the ride response. Ledger 301 also stores the location of the driver device that the driver account is installed on. It should be noted that even though the time at which the ride response was transmitted is a unique value, the hashed value of the ride response, as calculated by the processor in the driver device, may be slightly different than the hash value calculated by the one or more processors in the one or more servers. The reason why the hash value calculated by the processor may be different than the hash value calculated by the one or more processors is because the location determined by the processor in the driver device may be different than the location determined by the one or more processors in the one or more servers.

The method may then progress to step 514, where the cloud network 106 may determine a first location of a driver device associated with the driver account (e.g., driver account 303) based on the ride response. For example, ledger 301 may determine a location of a mobile device (e.g., mobile device 105) at which the mobile device transmitted the ride response. The driver account may be associated with the mobile device. More specifically, the one or more processors in the one or more servers of cloud network 106 may identify a location at which the ride response was transmitted by the driver device based on location coordinates (e.g., GPS coordinates) in the ride response. The one or more processors may determine the location of the driver device when the driver account, executing on a processor of the driver device, transmitted the ride response. Because ledger 301 stores the ride response as a hashed value, ledger 301 also stores, along with the ride response, the location at which the driver device transmitted the ride response. Because the location of the driver device at which the driver response was transmitted, as determined by the one or more processors, may be different than the location of the driver device as determined by the processor in the driver device, the hashed value stored in ledger 301 of the ride response, the time, and the location at which the ride response was transmitted may be different than the hashed value determined by the processor in the driver device.

The reason why the location as determined by the processor in the driver device may be different from the location as determined by the one or more processors may be due to a GPS receiver in the driver device incorrectly calculating the GPS coordinates. For example, the GPS receiver may calculate GPS coordinates for the driver device that do not coincide with a location where a driver could drive her automobile. For instance, the GPS receiver may calculate the GPS coordinates of a body of water, and the processor may determine that the GPS coordinates coincide with the actual location of the driver device. Because the hashed value is based on the location of the driver device, which coincides with the GPS coordinates, the hashed value will be based on the coordinates of a location on the body of water. The one or more servers however may have access to additional map data that the one or more processors can use to determine that the driver device is not in the body of water, but rather on a street, for example, next to a boardwalk bordering the body of water. Accordingly, the one or more processors may determine that the GPS coordinates of the driver device are different from the GPS coordinates calculated by the GPS receiver. As a result, the location stored in ledger 301, for the driver device, is different from the location stored in driver account 303. Rider account 302 may also receive and store the location of the driver device, from ledger 301, and the processor in the rider device may determine that the location of the driver device is different from the location stored in driver account 303. The location of the driver device, determined by the processor in the rider device, may be different from the location stored in ledger 301.

After determining the time and location at which the driver device transmitted the ride response the method may progress to step 516. At step 516, the cloud network 106 may determine one or more driver parameters corresponding to a driver associated with the driver account. For example, a driver associated with mobile device 105 may take a picture that is recorded in his driver account (e.g., driver account 303). The one or more driver parameters associated with the driver may be hair color, eye color, and any number of facial parameters (e.g., shape of lips, eyes, nose, eyebrows, ears, etc.) that may be recognizable by a human or facial recognition software. The one or more driver parameters could also be personally identifiable marks such as scars and/or tattoos. Additionally, the one or more driver parameters may include clothing that the driver is wearing at the time the driver transmitted the ride response. Any of the one more driver parameters may have been input by the driver via a description field of the driver account or a picture taken by the driver around the time the driver account transmitted the ride request. Because ledger 301 stores the ride response as a hashed value, ledger 301 also stores along with the ride response, the one or more driver parameters corresponding to the driver. Because the one or more driver parameters of each driver is unique (barring identical twins), the hashed value of the ride response may have a further degree of uniqueness based on the one or more driver parameters corresponding to the driver. After step 516, the method may progress to step 518 where the cloud network 106 may determine one or more second parameters corresponding to an automobile associated with driver. For example, the make, model, year, trim, color, of the automobile may be determined based on a picture of the automobile saved to the driver account by the driver. In some embodiments, the one or more processors in the one or more servers of cloud network 106 may execute image recognition instructions that cause the one or more processors to classify the automobile based on the picture. For example, the one or more processors may determine the make, model, year, trim, and color of the automobile based on an analysis of the picture.

The method may then progress to step 520, where the cloud network 106 may transmit the first time, first location, and one or more driver parameters to the rider account. For example, ledger 301 may transmit the first time that the ride response was transmitted, the first location of the driver device when the ride response was transmitted, and the one or more driver parameters to rider account 302. At step 522, the cloud network 106 may generate a second hash associated with the ride request based at least in part on the first part of the second key, the second part of the second key, first time, first location, and the one or more driver parameters. More specifically the one or more processors in the one or more servers in cloud network 106 may generate the second hash, and then may store the second hash in the ledger (e.g., ledger 301) at step 522. After the cloud network 106 stores the second hash in the ledger, the method may return to method 200.

Figure 6:
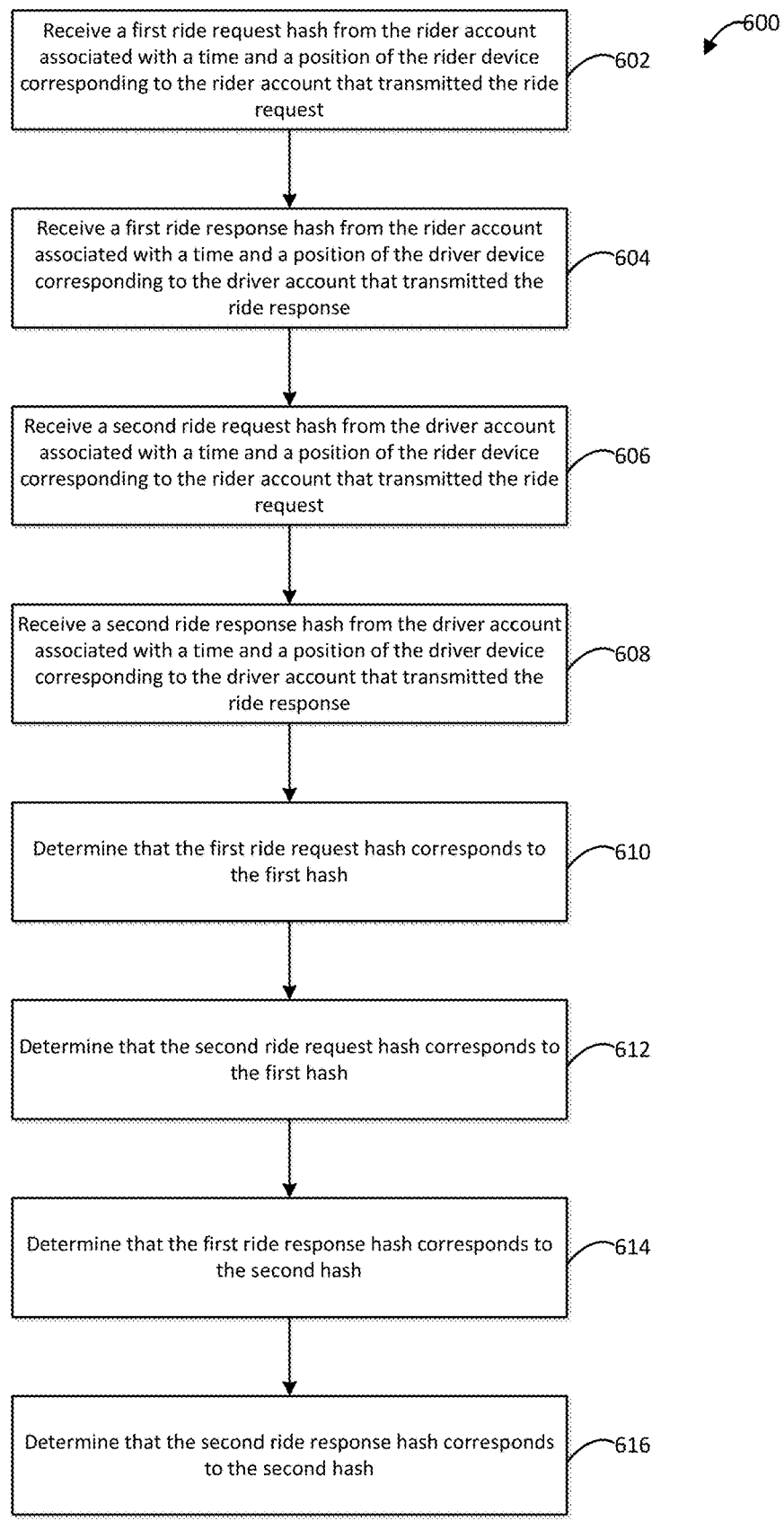
FIG. 6 depicts an illustrative flowchart of the ride sharing service network cloud comparing the hash associated with the request to a ride request hash received from the rider's rider account and the driver's driver account, and comparing the hash associated with the response to a ride response hash received from the rider's rider account and the driver's driver account, in accordance with various embodiments of the disclosure.

FIG. 6 depicts an illustrative flowchart of the ride sharing service network cloud comparing the hash associated with the request to a ride request hash received from the rider's account and the driver's account, and comparing the hash associated with the response to a ride response received from the rider's account and the driver's account, in accordance with various embodiments of the disclosure. It will be readily appreciated that the illustrated procedure can be altered to delete steps or further include additional steps. While the following description is directed to a method (i.e., method 600) being performed by the one or more servers in cloud network 106, it is appreciated that the method can be performed in whole or in part by a device other than the one or more servers (e.g., an edge server located at or near cellular towers 101 and/or 111).

At step 602, the cloud network 106 may receive a first ride request hash from the rider account associated with a time and a location of the rider device corresponding to the rider account that transmitted the ride request. For example, ledger 301 may receive a first ride request hash associated with a time and a location of the mobile device that transmitted the ride request and that rider account 302 is installed on. For instance, a ledger stored in the one or more servers of cloud network 106 may receive the first ride request hash from a rider account, installed on mobile device 109, and the first ride request hash may correspond to the time and location of mobile device 109. It should be noted that the ride request hash may also be associated with a first part of a first key and a second part of the first key. The first key may be a key that the rider account and ledger use to encode transactions sent between the ledger and the rider account. For example, the first part of the first key (e.g., in step 404), and the second part of the first key (e.g., in step 406) may be used, by the rider account, to calculate the first ride request hash. It should also be noted that the ride request hash may also be associated with the one or more rider parameters (e.g., in step 418).

After the first ride request hash is received, the method may progress to step 604, where the cloud network 106 may receive a first ride response hash from the rider account associated with a time and a location of the driver device corresponding to the driver account that transmitted the ride response. For example, ledger 301 may receive a first ride response hash associated with a time and location of the mobile device that transmitted the ride response and that driver account 303 is installed on. For instance, a ledger stored in the one or more severs of cloud network 106 may receive the first ride response hash from a rider account installed on mobile device 109, and the first ride response hash may correspond to the time and location of mobile device 105. The reason why the first ride response hash is received from the rider account installed on mobile device 109 is because the rider account stores the same information that is stored in the driver account and the ledger, as explained above. It should be noted that the first ride response hash may also be associated with a first part of a second key and a second part of the second key. The second key may be a key that the driver account and ledger use to encode transactions sent between the ledger and the driver account. For example, the first part of the second key (e.g., in step 508), and the second part of the second key (e.g., in step 510) may be used, by the rider account, to calculate the first ride response hash. It should also be noted that the first ride response hash may also be associated with the one or more driver parameters (e.g., in step 520).

After the first ride response hash is received, the method may progress to step 606, where the cloud network 106 may receive a second ride request hash from the driver account associated with a time and a location of the rider device corresponding to the rider account that transmitted the ride request. For example, ledger 301 may receive a second ride request hash associated with a time and location of the mobile device that transmitted the ride request and that rider account 302 is installed on. For instance, a ledger stored in the one or more severs of cloud network 106 may receive the second ride request hash from a driver account installed on mobile device 105, and the second ride request hash may correspond to the time and location of mobile device 109. The reason why the second ride request hash is received from the rider account installed on mobile device 105 is because the driver account stores the same information that is stored in the rider account and the ledger, as explained above. It should be noted that the second ride request hash may also be associated with a first part of a first key and a second part of the first key. The first part of the first key (e.g., in step 508) and the second part of the first key (e.g., in step 510) may be used, by the driver account, to calculate the second ride request hash. It should also be noted that the second ride request hash may also be associated with the one or more rider parameters (e.g., in step 418).

After the second ride request hash is received, the method may progress to step 608, where the cloud network 106 may receive a second ride response hash from the driver account associated with a time and a location of the driver device corresponding to the driver account that transmitted the ride response. For example, ledger 301 may receive a second ride response hash associated with a time and location of the mobile device that transmitted the ride response and that driver account 303 is installed on. For instance, a ledger stored in the one or more severs of cloud network 106 may receive the second ride response hash from a driver account installed on mobile device 105, and the second ride response hash may correspond to the time and location of mobile device 105. It should be noted that the second ride response hash may also be associated with a first part of a second key and a second part of the second key. The second key may be a key that the driver account and ledger use to encode transactions sent between the ledger and the driver account. For example, the first part of the second key (e.g., in step 508) and the second part of the second key (e.g., in step 510) may be used, by the driver account, to calculate the second ride response hash. It should also be noted that the second ride response hash may also be associated with the one or more driver parameters (e.g., in step 520).

At step 610, the cloud network 106 may determine if the first ride request hash corresponds to the first hash. For example, the one or more processors in the one or more servers of cloud network 106 may compare a first ride request hash value, corresponding to the first ride request hash, to a first hash value, corresponding to the first hash, and determine whether the comparison satisfies a ride request hash metric. For example, a ride request hash metric that may be used to compare the first ride request hash value to the first hash value may be a modulus of the first ride request hash value and the first hash value. The modulus may be a numerical value equal to an unsigned difference of the first ride request hash value and the first hash (absolute value of the difference of the first ride request hash value and the first hash). The cloud network 106 may determine that the first ride request hash value and the first hash value are sufficiently the same based at least in part on the numerical value being less than a designated value (e.g., a real number). As mentioned above, the ride request hash values stored in the driver account, ledger, and rider account may all be slightly different due to the locations determined by the driver device, cloud network 106, and rider device. Because the ride request hash values may be slightly different, the cloud network 106 may determine whether the numerical value is less than the designated value. If the cloud network 106 determines that the numerical value is not less than the designated value, the cloud network 106 may send a message to the rider account requesting an updated location of the rider device, and determine the unsigned difference again based on the updated location. If the numerical value of the unsigned difference is still not less than the designated value, then the method may end and return to method 200, where an error message may be issued to the rider device in step 218. Otherwise, the method may progress to step 612.

At step 612, the cloud network 106 may determine if the second ride request hash corresponds to the first hash. For example, the one or more processors in the one or more servers of cloud network 106 may compare a second ride request hash value, corresponding to the second ride request hash, to a first hash value, corresponding to the first hash, and determine whether the comparison satisfies the ride request hash metric described above. The cloud network 106 may determine that the second ride request hash value and the first hash value are sufficiently the same based at least in part on the numerical value being less than the designated value described above. As mentioned above, the ride request hash values stored in the driver account, ledger, and rider account may all be slightly different due to the locations determined by the driver device, the cloud network, and the rider device. Because the ride request hash values may be slightly different, the cloud network 106 may determine whether the numerical value is less than the designated value. If the cloud network 106 determines that the numerical value is not less than the designated value, the cloud network 106 may send a message to the rider account requesting an updated location of the rider device and determine the unsigned difference again based on the updated location. If the numerical value of the unsigned difference is still not less than the designated value, then the method may end and return to method 200, where an error message may be issued to the rider device at step 218. Otherwise, the method may progress to step 614.

At step 614, the cloud network 106 may determine if the first ride response hash corresponds to the second hash. For example, the one or more processors in the one or more servers of cloud network 106 may compare a first ride response hash value, corresponding to the first ride response hash, to a second hash value, corresponding to the second hash, and determine whether the comparison satisfies a ride response hash metric. For example, a ride response hash metric that may be used to compare the first ride response hash value to the second hash value may be a modulus of the first ride response hash value and the second hash value. The modulus may be a numerical value equal to an unsigned difference of the first ride response hash value and the second hash (absolute value of the difference of the first ride response hash value and the second hash). The cloud network 106 may determine that the first ride response hash value and the second hash value are sufficiently the same based at least in part on the numerical value being less than a designated value (e.g., a real number). As mentioned above, the ride response hash values stored in the driver account, ledger, and rider account may all be slightly different due to the locations determined by the driver device, cloud network 106, and rider device. Because the ride response hash values may be slightly different, the cloud network 106 may determine whether the numerical value is less than the designated value. If the cloud network 106 determines that the numerical value is not less than the designated value, the cloud network 106 may send a message to the driver account requesting an updated location of the driver device and determine the unsigned difference again based on the updated location. If the numerical value of the unsigned difference is still not less than the designated value, then the method may end and return to method 200, where an error message may be issued to the driver device at step 218. Otherwise, the method may progress to step 616.

At step 616, the cloud network 106 may determine if the second ride response hash corresponds to the second hash. For example, the one or more processors in the one or more servers of cloud network 106 may compare a second ride response hash value, corresponding to the second ride response hash, to a second hash value, corresponding to the second hash, and determine whether the comparison satisfies the ride response hash metric described above. The cloud network 106 may determine that the second ride response hash value and the second hash value are sufficiently the same based at least in part on the numerical value being less than a designated value (e.g., a real number). As mentioned above, the ride response hash values stored in the driver account, ledger, and rider account may all be slightly different due to the locations determined by the driver device, cloud network 106, and rider device. Because the ride response hash values may be slightly different, the cloud network 106 may determine whether the numerical value is less than the designated value. If the cloud network 106 determines that the numerical value is not less than the designated value, the cloud network 106 may send a message to the driver account requesting an updated location of the driver device and determine the unsigned difference again based on the updated location. If the numerical value of the unsigned difference is still not less than the designated value, then the method may end and return to method 200, where an error message may be issued to the driver device at step 218.

The cloud network 106 may compare the ride request hashes to the first hash in order to verify that another rider or driver has not logged into the rider account and/or the driver account after the ride request and/or ride response is received. For example, the cloud network 106 may generate the first hash after receiving the ride request, as explained above with reference to FIG. 4. This hash may be based on the first key, first time, first location, and/or one or more rider parameters. The cloud network 106 may request that the rider account and driver account send a hash associated with the ride request.

The cloud network 106 may request that the rider account and driver account send a hash in order to verify that the rider is the same person whose rider account transmitted the ride request, and the driver is the same person whose driver account received the ride request. If a second rider is logged into the rider account on another device, and the cloud network receives a hash associated with the ride request that does not satisfy the metric above, then the cloud network 106 may determine that a second rider is logged into the rider account. For example, the cloud network 106 may be able to determine that a second rider is logged into the rider's account if the modulus of the hash received from the rider account, and the first hash is greater than some first threshold value. This first threshold value may indicate that the rider device has moved to a location that does not coincide with the location at which the ride request was transmitted. Another example in which the modulus may be greater than another threshold value may be when one or more parameters associated with the rider are different between the time when the ride request was transmitted by the rider account and the hash is received from the rider account.

The cloud network 106 may request that the driver account send a hash associated with the ride request to ensure that the driver picks up the correct rider at the correct location. As mentioned above, the driver account may determine that the location for pick up is not the same as the one communicated to it due to the GPS coordinates generated by the rider device coinciding with a location that is not reachable by a vehicle (e.g., a body of water). The cloud network 106 may also request the hash from the driver account because of errors that may be introduced by the driver account incorrectly recording the information associated with the ride request (e.g., first key, first time that the ride request was transmitted, the first location of the rider device when the ride request was transmitted, and/or one or more rider parameters). The cloud network 106 may also request the hash from the driver account to combat situations in which the information recorded by the driver account, may be different from the information transmitted by the cloud network 106 when a second driver logs into the driver account on a second driver device. For example, the second driver device may record a time and location of the rider device, in the driver account, that is different from the first time and first location. The cloud network 106 may determine that there is a discrepancy by determining that a modulus of the hash received from the driver account and the first hash is greater than a designated value as explained above.

The cloud network 106 may request hashes from the rider account and driver account with respect to the ride response and determine that there are discrepancies under similar scenarios to those described above with regard to the ride request.

Figure 7:
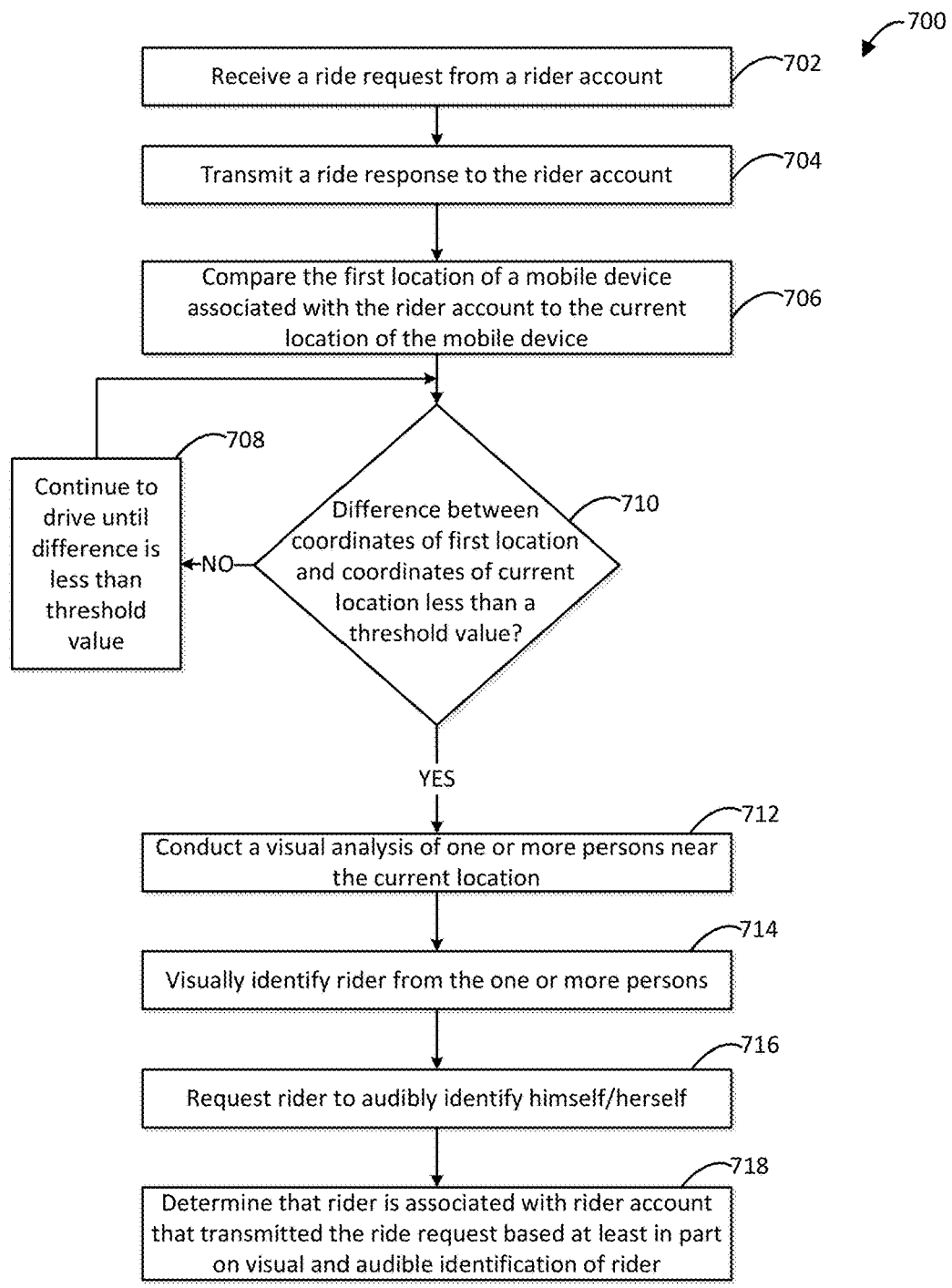
FIG. 7 depicts an illustrative flowchart for confirming a rider, in accordance with the various embodiments of the disclosure.

FIG. 7 depicts an illustrative flowchart for confirming a rider, in accordance with the various embodiments of the disclosure. While the following description is directed to a method (i.e., method 700) being performed by a driver or in automobile 110, it is appreciated that the method can be performed in whole or in part by a device other than the a driver in automobile 110 (e.g., by automobile 110). That is, in some embodiments automobile 110 may be an autonomous vehicle, and may perform some or all of the steps in method 700.

At step 702, a driver account may receive a ride request from a rider account. The driver account may also receive a timestamp associated with a time when the ride request was transmitted, and a location of the rider device, when the ride request was transmitted. The driver account may also receive a first key associated with the ride request as well as one or more rider parameters associated with physically identifying characteristics of the rider, as explained above. It should be noted that the ride request is received from the rider account through the cloud network 106 as illustrated in FIG. 3 above. As mentioned above, a ledger stores the ride request, first key, time and location at which the ride request was transmitted by the rider device, and the one or more rider parameters.

In some embodiments, after the driver account receives the ride request, the driver account may calculate a hash, associated with the ride request, based at least in part on the first key, first time, first location, and the one or more rider parameters.

At step 704, a driver account may transmit a ride response to the rider account, in response to receipt of the ride request. The driver account may also transmit a timestamp associated with a time when the ride response was transmitted, and a location of the driver device, when the ride response was transmitted. The driver account may also transmit a second key associated with the ride response as well as one or more driver parameters associated with physically identifying characteristics of the driver, as explained above, to the rider account. It should be noted that the ride response, second key, time, location, and one or more driver parameters are transmitted to the rider account through the cloud network 106 as illustrated in FIG. 3 above. As mentioned above, the ledger stores the ride response, second key, time and location at which the ride response was transmitted by the driver device, and the one or more driver parameters.

In some embodiments, after the driver account receives the ride request, the driver account may calculate a hash, associated with the ride request, based at least in part on the first key, first time, first location, and the one or more rider parameters.

At step 706, the driver account may compare the first location, of a mobile device that the rider account is executing computer-executable instructions on, to a current location of the mobile device. That is, the driver of an automobile, or the automobile itself, may determine whether the automobile is at the first location (pick up location) by comparing the current location, of the automobile, to the location of the first location. At step 710, the driver account may determine whether a difference between coordinates of the first location and coordinates of the current location is less than a threshold value. If the difference between the coordinates of the first location and the coordinates of the current location is not less than the threshold value, then the method may progress to step 708, where the automobile may continue to drive until the difference between the coordinates of the first location and the coordinates of the current location is less than the threshold value. If the difference between the coordinates of the first location and the coordinates of the current location is less than the threshold value, then the method may progress to step 712, where the driver and/or automobile may conduct a visual analysis of one or more persons near the current location. For example, the driver may visually inspect one or more persons and compare one or more features of each of the one or more persons to the one or more rider parameters in order to identify the rider. In some embodiments, a driver device, such as driver device 105, may be secured to a dashboard mount on the automobile that is positioned such that the field of view of a camera of the driver device captures the outside of the vehicle (e.g., through front windshield or driver side window of the automobile). The camera may be enabled to capture photographs or video footage, thereby enabling the driver account to conduct a visual analysis of the one or more persons outside of the vehicle. In some embodiments, the automobile may be equipped with one or more cameras that may conduct the visual analysis in substantially the same manner.

After the driver device and/or automobile conducts the visual analysis, the method may progress to step 714, where the driver account and/or automobile may visually identify the rider from the one or more persons. In some embodiments, the driver account may determine the rider based at least in part on a facial recognition analysis in which one or more images corresponding to the captured photographs, are compared to an image of the rider associated with the rider account. Based on the comparison the driver account may identify the rider from the one or more persons. In some embodiments, the automobile itself may conduct the facial recognition analysis in substantially the same manner.

At step 716, the driver and/or automobile may request that the rider audibly identify himself/herself. For example, the driver may ask the rider to give their name as well as additional information, such as the rider's destination, in order to confirm that the correct rider is being picked up. In some embodiments, the driver device may open a microphone port, and may receive and analyze audio signals corresponding to the audible sound generated by the rider as they are speaking, and may conduct a speech processing analysis to determine whether the rider is who they say they are. For example, a driver account on the driver device may execute instructions that cause the driver account to compare the audio signals to one or more signals associated with an audible sound recorded in the rider account. For instance, the driver account may request the one or more signals from the cloud network, which may store the one or more audio signals. In some embodiments, the automobile may be equipped with one or more microphones, and may conduct the speech processing analysis in substantially the same manner.

At step 718, the driver, driver device, and/or automobile may determine that the rider is associated with the rider account that transmitted the ride request based at least in part on the visual and audible identification of the rider.

Figure 8:
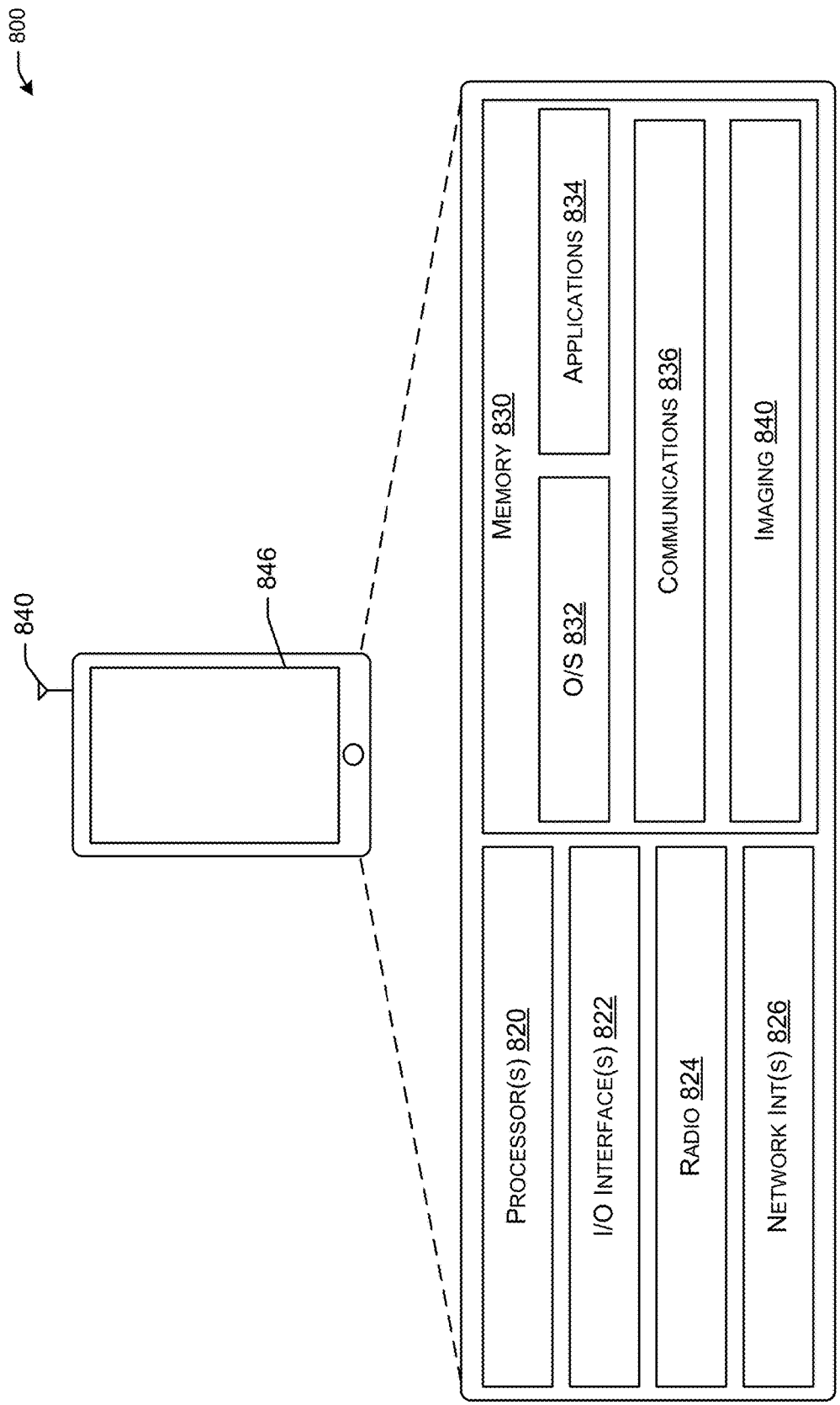
FIG. 8 depicts an exemplary architecture of a mobile device, in accordance with the various embodiments of the disclosure.

FIG. 8 depicts an exemplary architecture of a mobile device, in accordance with the various embodiments of the disclosure. The mobile devices 104, 105, and 109 may include one or more processor(s) 820, input/output (I/O) interface(s) 822, a radio 824, network interface(s) 826, and memory 830.

The processors 820 of the mobile devices 104, 105, and 109 may be implemented as appropriate in hardware, software, firmware, or combinations thereof. Software or firmware implementations of the one or more processors 820 may include computer-executable or machine-executable instructions written in any suitable programming language to perform the various functions described. Hardware implementations of the processors 820 may be configured to execute computer-executable or machine-executable instructions to perform the various functions described. In example embodiments, the processors 820 may be configured to execute instructions, software, and/or applications stored in the memory 830. The one or more processors 820 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The mobile devices 104, 105, and 109 may also include a chipset (not shown) for controlling communications between the one or more processors 820 and one or more of the other components of the mobile devices 104, 105, and 109. The one or more processors 820 may also include one or more application specific integrated circuits (ASICs) or application specific standard products (ASSPs) for handling specific data processing functions or tasks.

The one or more I/O device interfaces 822 may enable the use of one or more (I/O) device(s) or user interface(s) 846, such as a touch sensitive screen, keyboard, and/or mouse. The riders 102 and 108 and/or a driver may be able to administer images, sensor data, and communications phase information from the mobile devices 104, 105, and 109 by interacting with the user interfaces 846 via the I/O interfaces 822. The network interfaces(s) 826 may allow the mobile devices 104, 105, and 109 to communicate via the network 106 and/or via other suitable communicative channels. For example, the mobile devices 104, 105, and 109 may be configured to communicate with stored databases, other computing devices or servers, user terminals, or other devices on the networks 106.

The transmit/receive or radio 824 may include any suitable radio for transmitting and/or receiving radio frequency (RF) signals in the bandwidth and/or channels corresponding to the communications protocols utilized by the mobile devices 104, 105, and 109 to communicate with other server 110 via cellular base station 108. The radio component 824 may include hardware and/or software to modulate communications signals according to pre-established transmission protocols. The radio component 824 may be configured to generate communications signals for one or more communications protocols including, but not limited to, Wi-Fi, direct Wi-Fi, Bluetooth, 3G mobile communication, 4G mobile communication, long-term evolution (LTE), WiMax, direct satellite communications, or combinations thereof. In alternative embodiments, protocols may be used for communications between relatively adjacent mobile devices 104, 105, and 109, such as Bluetooth, dedicated short-range communication (DSRC), or other packetized radio communications. The radio component 824 may include any known receiver and baseband suitable for communicating via the communications protocols of the mobile devices 104, 105, and 109. The radio component may further include a low noise amplifier (LNA), additional signal amplifiers, an analog-to-digital (A/D) converter, one or more buffers, and digital baseband. In certain embodiments, the communications signals generated by the radio component 824 and transmitted via the antenna 840 may include an in-phase component (I) and a quadrature phase component (Q), where the in-phase component and the quadrature phase component is substantially orthogonal to each other. In other example embodiments, the transmitted communications signal may be generated by alternative transceiver implementations, including, for example, all-digital polar RF transceivers where the I and Q information may be mapped from the Cartesian coordinate system to polar (amplitude and phase) coordinate systems. The radio may further be configured to measure and encode phase information such as IQ phase data onto a transmitted signal from the mobile devices 104, 105, and 109.

The memory 830 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 830 may store program instructions that are loadable and executable on the processor(s) 820, as well as data generated or received during the execution of these programs. The memory 830 may have stored thereon software modules including an operating system (O/S) module 832, applications module 834, communications module 836, and imaging module 840. Each of the modules and/or software stored on the memory 830 may provide functionality for the mobile devices 104, 105, and 109, when executed by the processors 820.

The O/S module 832 may have one or more operating systems stored thereon. The processors 820 may be configured to access and execute one or more operating systems stored in the (O/S) module 832 to operate the system functions of the mobile devices 104, 105, and 109. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 834 may contain instructions and/or applications thereon that may be executed by the processors 820 to provide one or more functionality associated with the mobile devices 104, 105, and 109, including functions related to providing images, sensor data, and/or wireless communications signal phase information, as well as receiving mapping data and/or images for rendering to the riders 102 and 108 and/or a driver. These instructions and/or applications may, in certain aspects, interact with the (O/S) module 832 and/or other modules of the mobile devices 104, 105, and 109. The applications module 834 may have instructions, software, and/or code stored thereon that may be launched and/or executed by the processors 820 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The communications module 836 may have instructions stored thereon that, when executed by the processors 820, enable the mobile devices 104, 105, and 109 to provide a variety of communications functionality. In one aspect, the processors 820, by executing instructions stored in the communications module 836, may be configured to demodulate and/or decode communications signals received by the mobile devices 104, 105, and 109 via the antenna 840 and radio 824. The processors 820 may further be configured to identify one or more phase information carried on the received communications signals from the cellular base station 108. The received communications signals may further carry audio, beacons data, handshaking, information, and/or other data thereon. In another aspect, the processors 820, by executing instructions form at least the communications module 836, may be configured to generate and transmit communications signals via the radio 824 and/or the antenna 830. The processors may encode and/or modulate communications signals to be transmitted by the mobile devices 104, 105, and 109.

The imaging module 840 may have instructions stored thereon that, when executed by the processors 820, configure the mobile devices 104, 105, and 109 to provide a variety of imaging functions. In one aspect, the processors 820 may be configured to initiate capturing an image via an image sensor (not shown). In some example embodiments, the processors 820 may perform some preliminary image manipulation processes prior to transmitting the image to the server 110 via the network 106. In some other example embodiments, the processors 820 may be configured to only transmit images that may be provide enhancements to the mapping of a particular structure.

Figure 9:
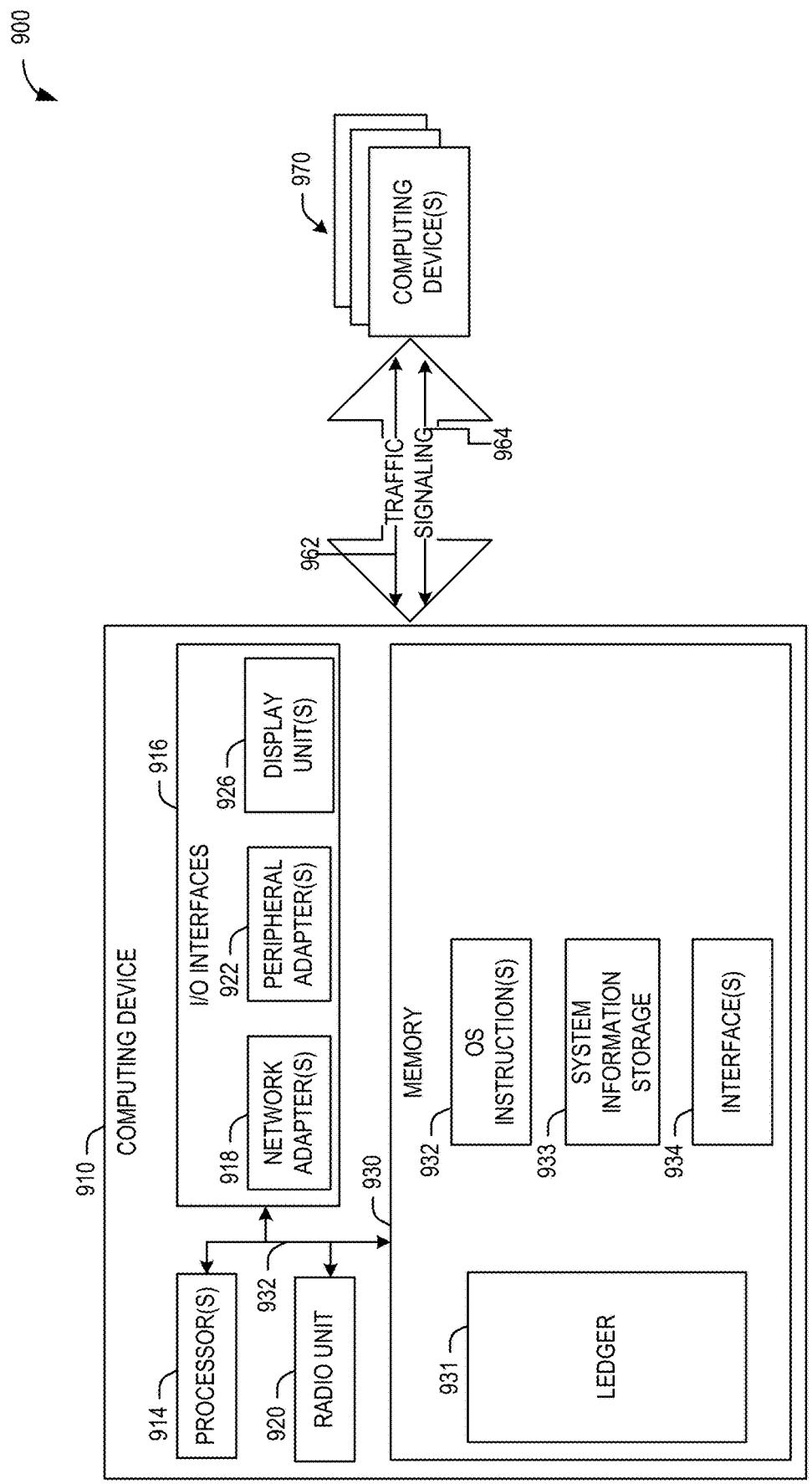
FIG. 9 depicts an exemplary computational environment, in accordance with the various embodiments of the disclosure.

FIG. 9 depicts an exemplary computational environment, in accordance with the various embodiments of the disclosure. FIG. 9 illustrates one of the one or more servers in cloud network 106 storing a ledger (i.e., ledger 931) in memory (i.e., memory 930), in accordance with one or more aspects of the disclosure. The example computational environment 900 is only illustrative and is not intended to suggest or otherwise convey any limitation as to the scope of use or functionality of such computational environment's architecture. In addition, the computational environment 900 should not be interpreted as having any dependency or requirement relating to any one or combination of components illustrated in this example computational environment.

The computational environment 900 represents an example of a software implementation of the various aspects or features of the disclosure in which the processing or execution of the operations described in connection with the power control described herein, including the processing of information communicated (e.g., encoded, modulated, and/or arranged) in accordance with this disclosure, can be performed in response to the execution of one or more software components at the computing device 910. It should be appreciated that the one or more software components can render the computing device 910, or any other computing device that contains such components, a particular machine for storing transactions received from mobile devices 104, 105, and 109, and storing transactions that are sent to mobile devices 104, 105, and 109 as described herein. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 910 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 910 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with power control, including the processing of information communicated (e.g., encoded, modulated, and/or arranged) in accordance with the features described herein, can comprise personal computers; server computers; laptop devices; handheld computing devices, such as mobile tablets; wearable computing devices; and multiprocessor systems. Additional examples can include set-top boxes, programmable consumer electronics, network PCs, minicomputers, mainframe computers, blade computers, programmable logic controllers, distributed computing environments that comprise any of the above systems or devices, and the like.

As illustrated, the computing device 910 can comprise one or more processors 914, one or more input/output (I/O) interfaces 916, a memory 930, and a bus architecture 932 (also termed bus 932) that functionally couples various functional elements of the computing device 910. The bus 932 can include at least one of a system bus, a memory bus, an address bus, or a message bus, and can permit the exchange of information (data, metadata, and/or signaling) between the processor(s) 914, the I/O interface(s) 916, and/or the memory 930, or the respective functional elements therein. In scenarios in which the processor(s) 914 include multiple processors, the computing device 910 can utilize parallel computing.

The I/O interface(s) 916 can permit or otherwise facilitate the communication of information between the computing device and an external device, such as another computing device, e.g., a network element or an end-user device. Such communication can include direct communication or indirect communication, such as the exchange of information between the computing device 910 and the external device via a network or elements thereof. As illustrated, the I/O interface(s) 916 can comprise one or more of network adapter(s) 918, peripheral adapter(s) 922, and display unit(s) 926. Such adapter(s) can permit or facilitate connectivity between the external device and one or more of the processor(s) 914 or the memory 930. In one aspect, at least one of the network adapter(s) 918 can couple functionally the computing device 910 to one or more computing devices 970 via one or more traffic and signaling pipes 964 that can permit or facilitate exchange of traffic 962 and signaling 964 between the computing device 910 and the one or more computing devices 970. Such network coupling provided at least in part by the at least one of the network adapter(s) 918 can be implemented in a wired environment, a wireless environment, or both. The information that is communicated by the at least one network adapter can result from the implementation of one or more operations in a method of the disclosure. Such output can be any form of visual representation including, but not limited to, textual, graphical, animation, audio, tactile, and the like. In certain scenarios, computing devices 970 may be anyone of mobile devices 104, 105, and 109. In addition or in the alternative, the display unit(s) 926 can include functional elements (e.g., lights, such as light-emitting diodes; a display, such as a liquid crystal display (LCD), combinations thereof, or the like) that can permit control of the operation of the computing device 910, or can permit conveying or revealing the operational conditions of the computing device 910.

Radio Unit 920 may comprise one or more processors, transceivers, and antennas communicatively coupled to the one or more processors and transceivers. Radio Unit 920 may transmit and receive signals using the antenna and transceiver.

In one aspect, the bus 932 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, a Universal Serial Bus (USB), and the like. The bus 932, and all buses described herein, can be implemented over a wired or wireless network connection, and each of the subsystems, including the processor(s) 914, the memory 930 and memory elements therein, and the I/O interface(s) 916 can be contained within one or more remote computing devices 970 at physically separate locations, connected through buses of this form, in effect implementing a fully distributed system.

The computing device 910 can comprise a variety of computer-readable media. Computer-readable media can be any available media (and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 910, and can comprise, for example, both volatile and non-volatile media, and removable and/or non-removable media. In one aspect, the memory 930 can comprise computer-readable media in the form of volatile memory, such as random access memory (RAM), and/or non-volatile memory, such as read-only memory (ROM).

The memory 930 can comprise ledger 931. System information storage 933 may comprise instructions that cause processor(s) 914 to send store each transaction received from mobile devices 104, 105, and 109 as a hash, and to store each transaction sent to mobile devices 104, 105, and 109 as a hash as described above. Such information can include at least one of code instructions, information structures, or the like. At least one of the one or more interfaces 950 (e.g., application programming interface(s)) can permit or facilitate the communication of information between two or more components within the functionality ledger 931. The information that is communicated by the at least one interface can result from implementation of one or more operations in a method of the disclosure.

In addition, the memory 930 can comprise computer-accessible instructions and information (e.g., data and/or metadata) that permit or facilitate the operation and/or administration (e.g., upgrades, software installation, any other configuration, or the like) of the computing device 910. Accordingly, as illustrated, the memory 930 can comprise a memory element 942 (labeled OS instruction(s) 942) that contains one or more program modules that embody or include one or more operating systems, such as Windows operating system, Unix, Linux, Symbian, Android, Chromium, and substantially any operating system suitable for mobile computing devices or tethered computing devices. In one aspect, the operational and/or architectural complexity of the computing device 910 can dictate a suitable operating system. The memory 930 also comprises a system information storage 946 having data and/or metadata that permits or facilitates the operation and/or administration of the computing device 910. Elements of the OS instruction(s) 942 and the system information storage 946 can be accessible or can be operated on by at least one of the processor(s) 914.

The computing device 910 and/or one of the computing device(s) 970 can include a power supply (not shown), which can power up components or functional elements within such devices. The power supply can be a rechargeable power supply, e.g., a rechargeable battery, and it can include one or more transformers to achieve a power level suitable for operation of the computing device 910 and/or one of the computing device(s) 970, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 918) to connect operationally to the conventional power grid. In another aspect, the power supply can include an energy conversion component, such as a solar panel, to provide additional or alternative power resources or autonomy for the computing device 910 and/or one of the computing device(s) 970.

The computing device 910 can operate in a networked environment by utilizing connections to one or more remote computing devices 970. As an illustration, a remote computing device can be a personal computer, a portable computer, a server, a router, a network computer, a peer device or other common network node, and so on. As described herein, connections (physical and/or logical) between the computing device 910 and a computing device of the one or more remote computing devices 970 can be made via one or more traffic and traffic 962 or signaling 964 which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Example Embodiments

In some instances, the following examples may be implemented together or separately by the systems and methods described herein.

Example 1 may include a method comprising: processing, by one or more computers coupled to at least one memory, a ride request received from a first mobile device; and generating, by the one or more computers, a first hash corresponding to the ride request.

Example 2 may include the method of example 1, further comprising: storing, by the one or more computers, the first hash in a ledger, wherein the ledger is stored in the at least one memory.

Example 3 may include the method of example 1 and/or some other example herein, further comprising: transmitting, by the one or more computers, the ride request to a second mobile device.

Example 4 may include the method of example 3 and/or some other example herein, further comprising: processing, by the one or more computers, a ride response from the second mobile device, responsive to the ride request; and generating, by the one or more computers, a second hash corresponding to the ride response.

Example 5 may include the method of example 4 and/or some other example herein, further comprising: storing, by the one or more computers, the second hash in a ledger, wherein the ledger is stored in the at least one memory.

Example 6 may include the method of example 4 and/or some other example herein, further comprising: transmitting, by the one or more computers, the ride response to the first mobile device.

Example 7 may include a device, comprising: at least one memory storing computer-executable instructions; and at least one processor configured to access the at least one memory and execute the computer-executable instructions to: process a ride request received from a first mobile device; and generate a first hash corresponding to the ride request.

Example 8 may include the device of example 7 and/or some other example herein, wherein the at least one processor is further configured to execute the computer-executable instructions to: transmit the ride request to a second mobile device.

Example 9 may include the device of example 7 and/or some other example herein, wherein the at least one processor is further configured to execute the computer-executable instructions to: process a ride response from the second mobile device, responsive to the ride request; generate a second hash corresponding to the ride response; and store the second hash in a ledger.

Example 10 may include the device of example 9 and/or some other example herein, wherein the at least one processor is further configured to execute the computer-executable instructions to: transmit the ride response to the first mobile device.

Example 11 may include the device of example 8 and/or some other example herein, wherein the at least one processor is further configured to execute the computer-executable instructions to: transmit a first part of a ride request key to the second mobile device.

Example 12 may include the device of example 11 and/or some other example herein, wherein the at least one processor is further configured to execute the computer-executable instructions to: transmit a second part of the ride request key to the second mobile device.

Example 13 may include the device of example 9 and/or some other example herein, wherein the at least one processor is further configured to execute the computer-executable instructions to: transmit a first part of a ride response key to the first mobile device.

Example 14 may include the device of example 13 and/or some other example herein, wherein the at least one processor is further configured to execute the computer-executable instructions to: transmit a second part of the ride response key to the first mobile device.

Example 15 may include a method comprising: receiving, by one or more computers, a ride request from a rider account; transmitting, by the one or more computes, a ride response to the rider account; comparing, by the one or more computers, a first location to a current location, as the one or more computers approach the first location; determining, by the one or more computers, that a difference between the first location and the current location is less than a threshold value; conducting a visual analysis of one or more persons proximate to the current location; requesting that a rider, of the one or more persons, audibly identify themselves; and determining, based at least in part on the audible identification and visual identification, that the rider is associated with the rider account.

Example 16 may include the method of example 15 and/or some other example herein, further comprising: receiving, by the one or more computers, a first part of a ride request key; and receiving, by the one or more computers, a second part of the ride request key.

Example 17 may include the method of example 15 and/or some other example herein, further comprising: transmitting, by the one or more computers, a first part of a ride response key; and receiving, by the one or more computers, a second part of the ride response key.

Example 18 may include the method of example 15 and/or some other example herein, further comprising: transmitting, by the one or more computers, a second ride request hash; and transmitting, by the one or more computers, a second ride response hash.

Example 19 may include the method of example 15 and/or some other example herein, wherein conducting the visual analysis of one or more persons proximate to the current location comprises: comparing the one or more persons to an image of the rider store in the one or more computers.

Example 20 may include the method of example 15 and/or some other example herein, wherein audible identification is based at least in part on comparing an audible signal of the rider to an audible signal received from the rider account that is associated with the rider.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation. Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

What is claimed is:

1. A method comprising:
   processing, by one or more computers coupled to at least one memory, a ride request received from a first mobile device;
   generating, by the one or more computers, a first hash corresponding to the ride request;
   transmitting, by the one or more computers, the ride request to a second mobile device;
   processing, by the one or more computers, a ride response from the second mobile device, responsive to the ride request; and
   generating, by the one or more computers, a second hash corresponding to the ride response.

2. The method of claim 1, further comprising:
   storing, by the one or more computers, the first hash in a ledger, wherein the ledger is stored in the at least one memory.

3. The method of claim 1, further comprising:
   storing, by the one or more computers, the second hash in a ledger, wherein the ledger is stored in the at least one memory.

4. The method of claim 1, further comprising:
   transmitting, by the one or more computers, the ride response to the first mobile device.

5. A device, comprising:
   at least one memory storing computer-executable instructions; and
   at least one processor configured to access the at least one memory and execute the computer-executable instructions to:

process a ride request received from a first mobile device;
generate a first hash corresponding to the ride request;
transmit the ride request to a second mobile device; and
transmit a first part of a ride request key to the second mobile device.

6. The device of claim 5, wherein the at least one processor is further configured to execute the computer-executable instructions to:
process a ride response from the second mobile device, responsive to the ride request;
generate a second hash corresponding to the ride response; and
store the second hash in a ledger.

7. The device of claim 6, wherein the at least one processor is further configured to execute the computer-executable instructions to:
transmit the ride response to the first mobile device.

8. The device of claim 5, wherein the at least one processor is further configured to execute the computer-executable instructions to:
transmit a second part of the ride request key to the second mobile device.

9. The device of claim 6, wherein the at least one processor is further configured to execute the computer-executable instructions to:
transmit a first part of a ride response key to the first mobile device.

10. The device of claim 9, wherein the at least one processor is further configured to execute the computer-executable instructions to:
transmit a second part of the ride response key to the first mobile device.

11. A method comprising:
receiving, by one or more computers, a ride request from a rider account;
transmitting, by the one or more computes, a ride response to the rider account;
comparing, by the one or more computers, a first location to a current location, as the one or more computers approach the first location;
determining, by the one or more computers, that a difference between the first location and the current location is less than a threshold value;
conducting a visual analysis of one or more persons proximate to the current location;
requesting that a rider, of the one or more persons, audibly identify themselves; and
determining, based at least in part on the audible identification and visual identification, that the rider is associated with the rider account.

12. The method of claim 11 further comprising:
receiving, by the one or more computers, a first part of a ride request key; and
receiving, by the one or more computers, a second part of the ride request key.

13. The method of claim 11 further comprising:
transmitting, by the one or more computers, a first part of a ride response key; and
receiving, by the one or more computers, a second part of the ride response key.

14. The method of claim 11 further comprising:
transmitting, by the one or more computers, a second ride request hash; and
transmitting, by the one or more computers, a second ride response hash.

15. The method of claim 11, wherein conducting the visual analysis of one or more persons proximate to the current location comprises:
comparing the one or more persons to an image of the rider store in the one or more computers.

16. The method of claim 11, wherein audible identification is based at least in part on comparing an audible signal of the rider to an audible signal received from the rider account, that is associated with the rider.

* * * * *